US012786933B2

(12) United States Patent
Li

(10) Patent No.: US 12,786,933 B2
(45) Date of Patent: Nov. 3, 2026

(54) CELL POSITIONING METHOD AND APPARATUS, AND STORAGE MEDIUM

(71) Applicant: Beijing Xiaomi Mobile Software Co., Ltd., Beijing (CN)

(72) Inventor: Xiaolong Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 277 days.

(21) Appl. No.: 18/556,108

(22) PCT Filed: Apr. 19, 2021

(86) PCT No.: PCT/CN2021/088199
§ 371 (c)(1),
(2) Date: Oct. 19, 2023

(87) PCT Pub. No.: WO2022/222004
PCT Pub. Date: Oct. 27, 2022

(65) Prior Publication Data

US 2024/0373391 A1 Nov. 7, 2024

(51) Int. Cl.
*H04W 64/00* (2009.01)
*H04W 8/22* (2009.01)
*H04W 24/10* (2009.01)
*H04W 76/20* (2018.01)

(52) U.S. Cl.
CPC ............. *H04W 64/00* (2013.01); *H04W 8/22* (2013.01); *H04W 24/10* (2013.01); *H04W 76/20* (2018.02)

(58) Field of Classification Search
None
See application file for complete search history.

(56) References Cited

U.S. PATENT DOCUMENTS 8,718,675 B1 * 5/2014 Choi ..................... H04W 64/00 455/458
9,271,256 B2 * 2/2016 Edge ..................... H04L 12/18
9,277,523 B2 * 3/2016 Sampath ............... H04W 4/025
9,282,428 B1 * 3/2016 Choi ..................... H04W 4/02
9,294,875 B2 * 3/2016 Ahn ..................... G01S 5/0236
9,525,965 B2 * 12/2016 Gunnarsson .......... H04W 4/029
9,699,758 B2 * 7/2017 Edge ..................... H04W 64/00
9,763,051 B2 * 9/2017 Belghoul ............... H04W 4/02
(Continued)

FOREIGN PATENT DOCUMENTS

CN 101232414 A 7/2008
CN 102036165 A 4/2011
(Continued)

OTHER PUBLICATIONS

CN 102281494, Huang Bo, a Location Parameter Modification Method and System, Jun. 29, 2016, whole document.*
(Continued)

*Primary Examiner* — Tuan A Tran
(74) *Attorney, Agent, or Firm* — Oblon, McClelland, Maier & Neustadt, L.L.P.

(57) ABSTRACT

A cell positioning method includes determining that the terminal does not support a current positioning mode, and sending request information to a radio access network device. The request information is used for requesting a core network device to perform positioning mode switch for the terminal.

19 Claims, 17 Drawing Sheets

(56) References Cited

U.S. PATENT DOCUMENTS

| | | | | |
|---|---|---|---|---|
| 10,314,044 | B2 * | 6/2019 | Wu | H04W 60/04 |
| 10,638,254 | B2 * | 4/2020 | Jain | H04W 4/02 |
| 11,382,006 | B2 * | 7/2022 | Chen | H04W 48/18 |
| 11,601,909 | B2 * | 3/2023 | Liu | H04W 4/02 |
| 11,792,697 | B2 * | 10/2023 | Chen | H04W 8/12<br>370/336 |
| 11,877,257 | B2 * | 1/2024 | Liu | H04W 4/02 |
| 12,058,776 | B2 * | 8/2024 | Lindheimer | G06F 16/2255 |
| 12,126,478 | B2 * | 10/2024 | Sosnin | H04L 5/0032 |
| 12,177,739 | B2 * | 12/2024 | Sirotkin | H04W 4/029 |
| 12,185,132 | B2 * | 12/2024 | Shrestha | H04W 24/10 |
| 2020/0120479 | A1 | 4/2020 | Ryden et al. | |

FOREIGN PATENT DOCUMENTS

| | | |
|---|---|---|
| CN | 102281494 A | 12/2011 |
| CN | 106470477 A | 3/2017 |

OTHER PUBLICATIONS

International Search Report issued Jan. 19, 2022 in PCT/CN2021/088199, filed on Apr. 19, 2021, 4 pages (with English Translation).

Pseudo-CR on LCS-AP on SLS interface, draft specification (C4-092260), 3GPP TSG CT4 Meeting #45, 2009, 14 pages.

Summary of RRM relaxation behaviors (R2-2009080), 3GPP TSG-RAN WG2 Meeting #112-e, 2020, 4 pages.

3GPP TS 38.133 V18.3.0 (Sep. 2023); NR; Requirements for support of radio resource management (Release 18), 2023, 5,455 pages.

* cited by examiner

CELL POSITIONING METHOD AND APPARATUS, AND STORAGE MEDIUM

CROSS-REFERENCE TO RELATED APPLICATION

The present application is the U.S. National Stage of International Application No. PCT/CN2021/088199, filed on Apr. 19, 2021, the disclosure of which is incorporated herein by reference in its entirety for all purposes.

BACKGROUND

Description of the Related Art

In the new generation communication system, in order to reduce overhead of energy consumption caused by a terminal de vice performing radio resource management (RRM) measurement, RRM measurement relaxation has been introduced, i.e., a period of the RRM measurement performance of a serving cell may be amplified when the terminal device meets a certain condition.

SUMMARY

The present disclosure relates to the field of wireless communication technologies, in particular to a cell positioning method and apparatus, and a storage medium. The present disclosure provides a cell positioning method and apparatus, and a storage medium.

According to a first aspect of embodiments of the present disclosure, a cell positioning method is provided. The method is performed by a terminal, and includes determining that the terminal does not support a current positioning mode, and sending request information to a radio access network device, where the request information is used for requesting a core network device to perform positioning mode switch for the terminal.

According to a second aspect of the embodiments of the present disclosure, a cell positioning method is provided. The method is performed by a radio access network device, and includes receiving request information sent by a terminal, where the request information is used for requesting a core network device to perform positioning mode switch for the terminal, and sending the request information to the core network device.

According to a third aspect of the embodiments of the present disclosure, a cell positioning method is provided. The method is performed by a core network device, and includes receiving request information sent by a radio access network device, where the request information is used for requesting the core network device to perform positioning mode switch for a terminal, and performing the positioning mode switch for the terminal.

According to a fourth aspect of the embodiments of the present disclosure, a cell positioning method is provided. The method is performed by a radio access network device, and includes determining that the radio access network device does not support reporting a measurement result of a current positioning mode, and sending request information to a core network device, where the request information is used for requesting the core network device to perform positioning mode switch.

According to a fifth aspect of the embodiments of the present disclosure, a cell positioning method is provided. The method is performed by a core network device, and includes receiving request information sent by a radio access network device, where the request information is used for requesting the core network device to perform positioning mode switch, and performing the positioning mode switch for a terminal.

According to a sixth aspect of the embodiments of the present disclosure, a cell positioning apparatus is provided.

The cell positioning apparatus includes a processor and a memory that is configured to store an instruction executable by the processor. The processor is configured to perform the method described in the first aspect or any one of the embodiments of the first aspect, perform the method described in the second aspect or any one of the embodiments of the second aspect, perform the method described in the third aspect or any one of the embodiments of the third aspect, perform the method described in the fourth aspect or any one of the embodiments of the fourth aspect, or perform the method described in the fifth aspect or any one of the embodiments of the fifth aspect.

According to a seventh aspect of the embodiments of the present disclosure, a non-transitory computer-readable storage medium is provided. The computer-readable storage medium is configured to store an instruction. The instruction, when being executed, causes the method described in the first aspect or any one of the embodiments of the first aspect to be performed, the method described in the second aspect or any one of the embodiments of the second aspect to be performed, the method described in the third aspect or any one of the embodiments of the third aspect to be performed, the method described in the fourth aspect or any one of the embodiments of the fourth aspect to be performed, or the method described in the fifth aspect or any one of the embodiments of the fifth aspect to be performed.

It should be understood that the general description above and the following detailed description are exemplary and explanatory only and do not limit the present disclosure.

BRIEF DESCRIPTION OF THE DRAWINGS

The accompanying drawings, which are herein incorporated into and form a part of the specification, illustrate embodiments consistent with the present disclosure and are used in conjunction with the specification to explain the principles of the present disclosure.

DETAILED DESCRIPTION OF THE PREFERRED EMBODIMENTS

The embodiments are described herein in detail, examples of which are represented in the accompanying drawings. When the following description relates to the accompanying drawings, the same numerals in the different accompanying drawings indicate the same or similar elements unless otherwise indicated. The embodiments described in the following embodiments do not represent all embodiments consistent with the present disclosure. Rather, they are only examples of apparatus and methods consistent with some aspects of the present disclosure as detailed in the appended claims.

Figure 1:
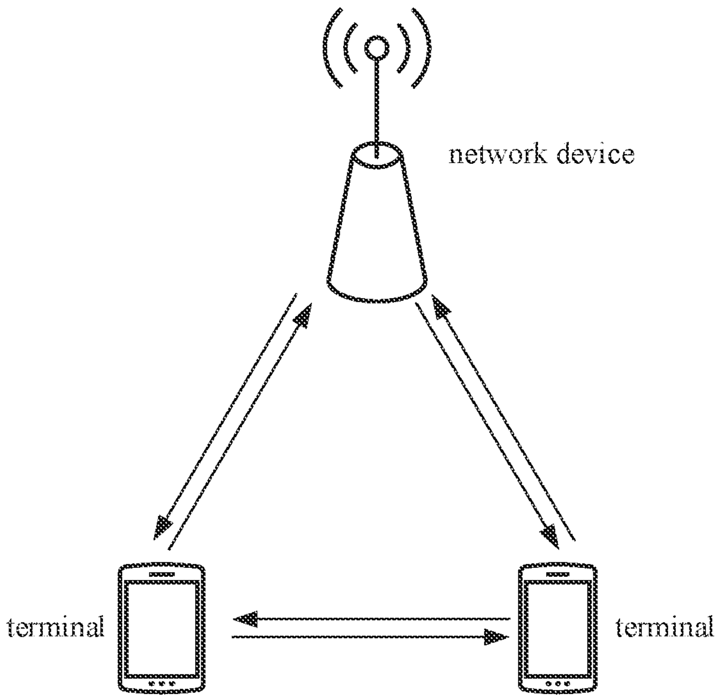
FIG. 1 is an architecture diagram of a communication system between a network device and a terminal illustrated according to an embodiment.

FIG. 1 is an architecture diagram of a communication system between a network device and a terminal illustrated according to an embodiment. Communication methods provided by the present disclosure may be applied in the architecture diagram of the communication system shown in FIG. 1. As shown in FIG. 1, a network side device may send signaling based on the architecture shown in FIG. 1.

It can be understood that the communication system between the network device and the terminal shown in FIG. 1 is for schematic illustration only, and other network devices may be included in the radio communication system. For example, a core network device, a wireless relay device, and a wireless backhaul device, etc., which are not depicted in FIG. 1, may also be included. The embodiments of the present disclosure do not limit the number of network devices and the number of terminals included in the radio communication system.

It can be further understood that the radio communication system of the embodiments of the present disclosure is a network providing a wireless communication function. The radio communication system may apply different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), or carrier sense multiple access with collision avoidance. Different networks may, based on their capacity, rate, latency, and other factors, be categorized as 2G (English: generation) networks, 3G networks, 4G networks, or future evolution networks such as 5G networks, which may also be referred to as new radio (NR) networks. For the convenience of description, the radio communication network is sometimes referred to as a network in the present disclosure.

Further, the network device involved in the present disclosure may also be referred to as a radio access network device. The radio access network device may be: a base station, an evolved node B (base station), a home base station, or an access point (AP), a wireless relay node, a wireless backhaul node, a transmission point (TP), or a transmission and reception point (TRP) in a wireless fidelity (WIFI), etc. The radio access network device may also be a gNB in an NR system, or a component or part of a device that constitutes a base station, etc. The network device may also be an in-vehicle device when the communication system is a vehicle-to-everything (V2X) communication system. It should be understood that the embodiments of the present disclosure do not limit the specific technology and the specific device form applied for the network device.

Further, the terminal involved in the present disclosure, which may also be referred to as a terminal device, user equipment (UE), mobile station (MS), mobile terminal (MT), etc., is a device that provides voice and/or data connectivity to a user. For example, the terminal may be a device with a wireless connectivity function, such as a handheld device, an in-vehicle device, etc. Currently, some examples of the terminal are: a smart phone (mobile phone), a pocket personal computer (PPC), a palmtop computer, a personal digital assistant (PDA), a laptop computer, a tablet computer, a wearable device, or an in-vehicle device, etc. In addition, the terminal device may also be an in-vehicle device when the communication system is a vehicle-to-everything (V2X) communication system. It should be understood that the embodiments of the present disclosure do not limit the specific technology and the specific device form applied for the terminal.

Introducing the RRM measurement relaxation eliminates the need to measure reference signal receiving power (RSRP) of a neighbor cell. However, for certain positioning modes (such as enhanced cell ID (E-CID) positioning mode), when the E-CID positioning mode is used for positioning, an RSRP measurement result of the neighbor cell is required. Therefore, without configuring the performance of the RSRP measurement for the neighbor cell, the E-CID positioning mode cannot be used. In the relaxation rule of R15, the measurement rule for cell reselection defined in TS 38.304 are as follows.

For intra-frequency measurements: if the serving cell satisfies $S_{rxlev}>S_{IntraSearchP}$ and $S_{qual}>S_{IntraSearchQ}$, the UE or the terminal may choose not to perform intra-frequency measurements. If the serving cell satisfies $S_{rxlev}\leq S_{IntraSearchP}$ or $S_{qual}<S_{IntraSearchQ}$, the terminal performs intra-frequency measurements.

For inter-frequency or inter-RAT measurements: if the serving cell satisfies $S_{rxlev}>S_{nonIntraSearchP}$ and $S_{qual}>S_{nonIntrasearchQ}$, the terminal may choose not to perform measurements of NR inter-frequencies or inter-RAT frequency cells of equal or lower priority; the terminal shall perform measurements of higher priority NR inter-frequency or inter-RAT frequencies for at least K*60 s, where K is the number of inter-frequency and inter-RAT frequency layers. If the serving cell satisfies $S_{rxlev}\leq S_{nonIntraSearchP}$ and $S_{qual}\leq S_{nonIntrasearchQ}$, the terminal shall search for and measure inter-frequency layers of higher, equal or lower priority in preparation for possible reselection. In other words, when the terminal performs neighbor cell intra-frequency/inter-frequency measurements (equal priority or lower priority), if the RSRP/RSRQ of the serving cell is higher than the threshold ($S_{IntrasearchP}$, $S_{IntrasearchQ}$,) intra-frequency/inter-frequency measurements of the same frequency/same priority or lower may be omitted. For high priority inter-frequency measurements for a neighbor cell, if the RSRP/RSRQ of the serving cell is higher than the threshold ($S_{nonIntrasearchP}$, $S_{nonIntrasearchQ}$,), the measurement is performed to relax to 60 s.

The measurement relaxation scheme of R16 in the related arts includes a judgment of relaxation criteria, i.e., the terminal needs to satisfy a certain criterion to be able to apply the relaxation. The rule generally is: configuring a certain measurement threshold for the terminal through the network, and the terminal making a judgment based on the rule and the threshold to determine whether relaxation can be applied. When the terminal satisfies different relaxation conditions, the measurement relaxation is applied according to the relaxation rules provided by the radio access network (RAN) 4. The relaxation conditions include: the terminal being not at the cell edge, or the terminal being in a low mobility state.

The terminal being in a low mobility state may be understood as: the current terminal being considered to be in a stationary or low mobility state if the difference between the receiving signal quality of the reference and the current RSRP of the terminal is less than a certain preset threshold ($S_{SearchDeltaP}$) for a certain period of time ($T_{SearchDeltaP}$), which means that a signal change is of a small magnitude. It is worth noting that this judgment only needs to be considered when the signal is falling, and the specific judgment conditions are as follows:

$$(S_{rxlevRef}-S_{rxlev})<S_{SearchDeltaP},$$

where $S_{rxlev}=S_{rxlev}$ of the current serving cell, in dB; $S_{rxlevRef}=S_{rxlev}$ reference value of the current serving cell, in dB.

The setting mode includes: (1) the terminal having selected or reselected a new cell; (2) ($S_{rxlev}-S_{rxlevRef}>0$); (3) no judgment condition being satisfied within $T_{SearchDeltaP}$.

When the terminal satisfies any of the above conditions, the terminal sets $S_{rxlevRef}$ to the $S_{rxlev}$ of the current serving cell. Regarding the setting of $T_{SearchDeltaP}$, it is set to 5 mins for LTE systems and satisfies the relationship of being a multiple of the measurement period. If eDRX is configured, $T_{SearchDeltaP}$ is set to the eDRX period if the eDRX period is greater than 5 mins. In LTE, even if the relaxation condition is satisfied, the terminal is required to perform measurement every 24 hours. For next generation communication systems (e.g., NR systems), R16 defines measurement relaxation or stopping measurement.

The terminal being not at the cell edge may be understood as: if the current $S_{rxlev}$ of the terminal is greater than the threshold value $S_{searchThresholdP}$ and $S_{qual}$ is than greater the threshold value $S_{searchThresholdQ}$ (if configured for the terminal by the network side device), the terminal being considered not to be at the cell edge, and the specific judgment conditions are as follows:

$S_{rxlev}>S_{searchThresholdP}$ and $S_{qual}>S_{searchThresholdQ}$ (if configured for the terminal by the network side device), where $S_{rxlev}=S_{rxlev}$ of the current serving cell, in dB; $S_{qual}=S_{qual}$ of the current serving cell, in dB.

Figure 2:
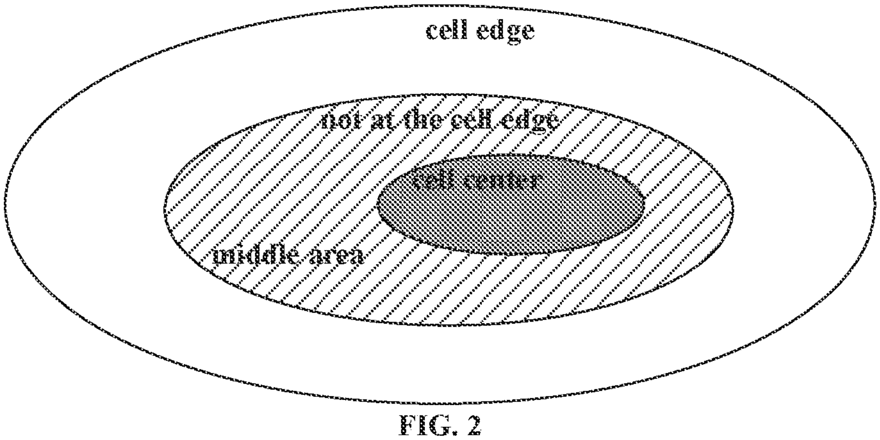
FIG. 2 is a schematic diagram of a cell communication range illustrated according to an embodiment.

FIG. 2 is a schematic diagram of a cell communication range illustrated according to an embodiment. As shown in FIG. 2, the following is included: a cell edge range, a range that is not at the cell edge, a cell center range, and the like.

The measurement mode includes the following three modes.

The first mode: the measurement period of the measurement that is performed to relax may be relaxed to a more relaxed time measurement interval.

The second mode: stop the measurement for one hour.

The third mode: for the high priority inter-frequency measurement, if the RSRP/RSRQ of the serving cell is higher than the threshold, then the measurement is performed to relax to K*60 s.

It should be noted that when no measurement relaxation is applied, the regular RRM measurement in accordance with the related arts is sufficient.

Therefore, it can be seen that the measurement results in R16 include the following: on the basis of the original R15, for additional extra to satisfy the relaxation conditions, for example, for non-central users of the same frequency/low priority, if it is satisfied that they are not at the cell edge or have low mobility, further relaxation of the measurement is carried out, i.e., the first mode is applied, i.e., the measurement period defined in R15 is relaxed to a wider time measurement interval.

With the development of communication technologies, a new type of terminal is proposed, which in the new generation of communication technologies (e.g., 5G) has low cost and low complexity and requires some degree of coverage enhancement. An example is the reduced capability UE (Redcap UE), or also referred to as NR-lite or Redcap terminal. This type of device is similar to the IoT device in LTE, and is different from the usual enhanced mobile broadband (eMBB) terminal. The Redcap terminal is stationary in some scenarios, and is therefore less mobile than the eMBB terminal. A common idea is to introduce a new judgment threshold for the Redcap terminal, i.e., to obtain the user's characteristics as stationary based on a stricter mobility criterion, but with the introduction of such a judgment rule for stationary terminals, it is very likely that the neighbor cell will not be measured for a longer period of time.

Therefore, for a positioning mode where the network configures the E-CID, the terminal needs to measure the RSRP of the serving cell and the neighbor cell. However, in the case of the terminal being at the edge with low mobility and applying measurement relaxation at this time, the relaxation of the measurement for the neighbor cell may lead to a reduction in the positioning accuracy of the terminal. The reason is that the measurement relaxation also extends the measurement interval when the measurement relaxation is applied, and if the measurement is still reported according to this measurement result, it will lead to inaccurate positioning. As for the stationary users at the edge, they may not be able to perform positioning because there is no neighbor cell measurement result. Therefore, it is necessary to trigger the positioning server to select for the positioning mode.

Figure 3:
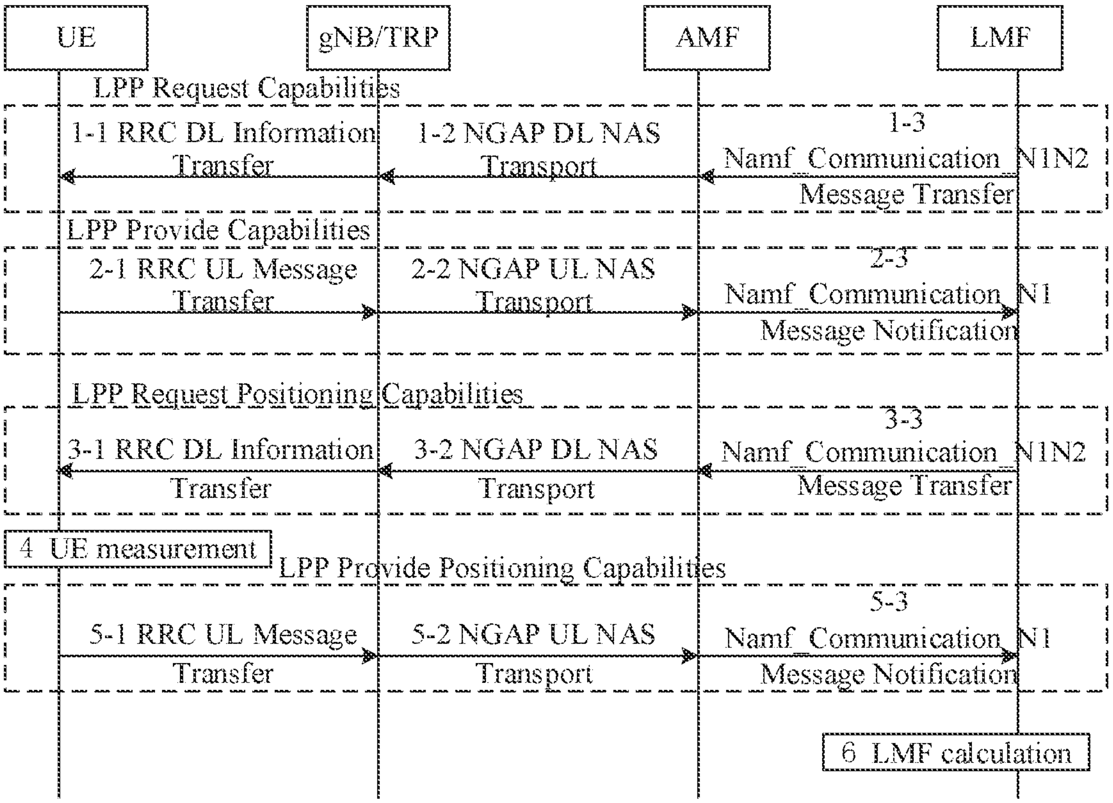
FIG. 3 is a flowchart of a downlink positioning illustrated according to an embodiment.

FIG. 3 is a flowchart of a downlink positioning illustrated according to an embodiment. The positioning mode of the downlink E-CID is shown in FIG. 3. The core network element (including the location management services (LMF) and the access and mobility management function (AMF)) requests capability information via a positioning protocol (LPP Request Capabilities), which includes: 1-1 Radio Resource Control (RRC) Downlink (DL) Information Transfer, 1-2 NGAP Downlink NAS Transport (NGAP DL NAS Transport), and 1-3 Namf_Communication_N1N2 Message Transfer. The terminal provides the capability information via the LPP (LPP Provide Capabilities), which includes: 2-1 RRC Uplink (UL) Message Transfer, 2-2 NGAP Uplink NAS Transport (NGAP UL NAS Transport), and 2-3 Namf_Communication_N1 Message Notification. The core network element requests positioning information via the positioning protocol (LPP Request Positioning Capabilities), which includes: 3-1 Radio Resource Control (RRC) Downlink (DL) Information Transfer, 3-2 NGAP Downlink NAS Transport (NGAP DL NAS Transport), and 3-3 Namf_Communication_N1N2 Message Transfer. The terminal performs measurement and provides the measurement result to the core network via the LPP. The terminal providing the positioning information (LPP Provide Positioning Capabilities) includes: 5-1 RRC Uplink (UL) Message Transfer, 5-2 NGAP Uplink NAS Transport (NGAP UL NAS Transport), and 5-3 Namf_Communication_N1 Message Notification. The LMF performs a calculation based on the received positioning information. It should be understood that the step of terminal measurement is skipped if the result of the RRM measurement is available, i.e., the terminal measurement is skipped. For delayed MT-LR, there is no need for the steps of the core network element requesting the capability information via the positioning protocol and terminal providing the capability information via the LPP, because the LMF needs to obtain the UE capability only once.

Figure 4:
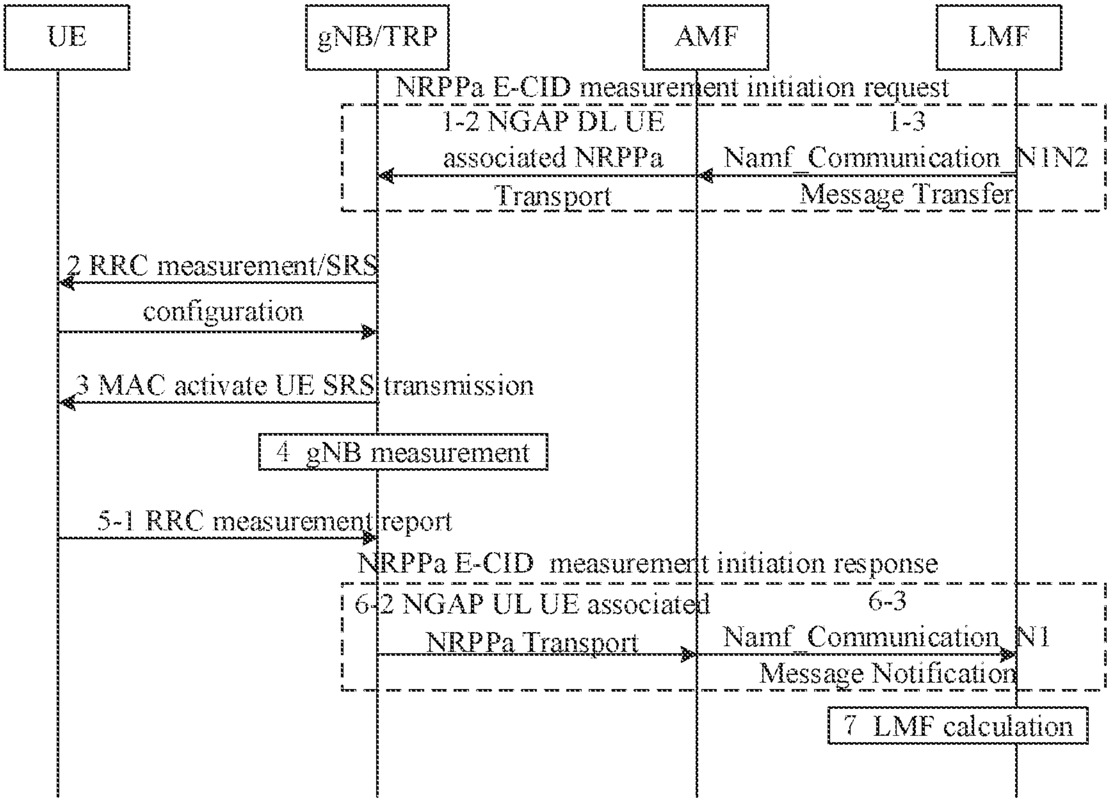
FIG. 4 is a flowchart of a downlink positioning illustrated according to an embodiment.

FIG. 4 is a flowchart of a downlink positioning illustrated according to an embodiment. The positioning mode of the downlink E-CID is shown in FIG. 4. The core network element (including the LMF and the AMF) sends an NRPPa E-CID measurement initiation request, which includes: 1-2 NGAP DL UE associated NRPPa Transport, and 1-3 Namf_Communication_N1N2 Message Transfer. The base station sends the RRC measurement/channel sounding reference signal (SRS) to the terminal and the terminal configures it. The base station performs measurement and the terminal sends an RRC measurement report to the base station. The base station sends an NRPPa E-CID measurement initiation response to the core network, which includes: 6-2 NGAP UL UE associated NRPPa Transport and 6-3 Namf_Communication_N1 Message Notification. The core network LMF performs a calculation.

Based on the above embodiments, it can be seen that for the positioning mode of the E-CID, the measurement of the RSRP for the home cell and the neighbor cell is required at this time. However, if the measurement of the neighbor cell is relaxed at this time, for example, for a user with low mobility and at the edge, the measurement of the neighbor cell is relaxed, then this may lead to a reduction in the positioning accuracy of the user applying the measurement relaxation. The reason is that the measurement relaxation also extends the measurement interval when the measurement relaxation is applied, and if the measurement is still reported according to this measurement result, it will lead to inaccurate positioning. As for the stationary users at the edge, they may not be able to perform positioning because there is no neighbor cell measurement result. Therefore, it is necessary to trigger the positioning server to select for the positioning mode. The present disclosure provides a cell positioning method, in which a terminal or a base station requests a core network device to perform positioning mode switch for the terminal, and positioning is performed based on the re-determined positioning mode, thereby obtaining a more accurate positioning accuracy.

In the embodiments of the present disclosure, for requesting the core network device to perform positioning mode switch for the terminal, the request to perform the positioning mode switch may be sent by the terminal or the radio access network device.

Figure 5:
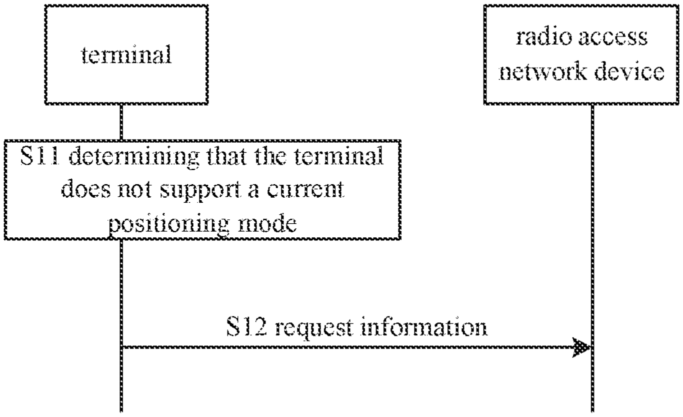
FIG. 5 is a flowchart of a cell positioning method illustrated according to an embodiment.

FIG. 5 is a flowchart of a cell positioning method illustrated according to an embodiment. As shown in FIG. 5, the cell positioning method is applied to a terminal, and includes the following steps S11 to S12.

At step S11, it is determined that the terminal does not support a current positioning mode.

At step S12, request information is sent to a radio access network device.

In an embodiment of the present disclosure, the request information is used for requesting a core network device to perform positioning mode switch for the terminal. Further, if the terminal does not currently support the positioning mode determined by the core network device (e.g., a positioning server of the core network), the request information is sent to the radio access network device to request to switch the current positioning mode. The current positioning mode, determined by the core network device, that is not supported by the terminal may be an E-CID positioning mode.

Through the cell positioning method provided by the embodiments of the present disclosure, the request information for the positioning mode switch can be sent to the radio access network device when it is determined that the terminal does not support the current positioning mode, causing the core network device to switch the current positioning mode. This avoids the problem of inaccurate or impossible positioning caused by the terminal performing positioning based on an unsupported positioning mode, thereby improving the accuracy of positioning.

In an embodiment of the present disclosure, the request information includes at least one of:

a positioning mode supported by the terminal;

a positioning mode not supported by the terminal; or a reason for the terminal to request the positioning mode switch.

The positioning mode that is not supported by the terminal included in the request information may be the E-CID positioning mode. The reason for the terminal to request the positioning mode switch included in the request information may be that the terminal is applying measurement relaxation. In other words, the terminal is configured with measurement relaxation within a specified time range.

In an embodiment of the present disclosure, the reason for the terminal to request the positioning mode switch includes the terminal being configured with cell measurement relaxation. The cell measurement relaxation is used for configuring the terminal to increase a measurement period for performing measurement for a neighbor cell.

Figure 6:
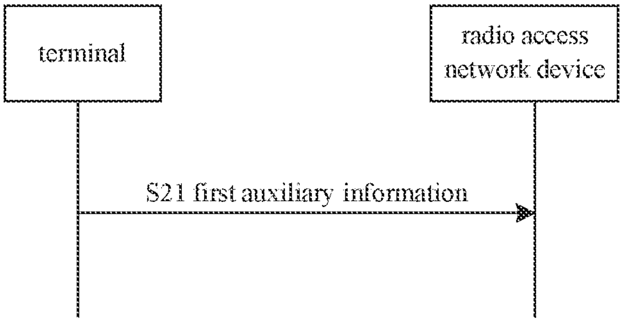
FIG. 6 is a flowchart of another cell positioning method illustrated according to an embodiment.

FIG. 6 is a flowchart of a cell positioning method illustrated according to an embodiment. As shown in FIG. 6, the cell positioning method is applied to a terminal, and includes the following step S21.

At step S21, first auxiliary information is sent to the radio access network device.

In an embodiment of the present disclosure, the first auxiliary information is used for indicating a time range for applying the cell measurement relaxation. It is further understood that the first auxiliary information is used for indicating the terminal to apply measurement relaxation within the specified time range. The first auxiliary information may be time-related auxiliary information reporting the time range during which the terminal applies the measurement relaxation. For example, the terminal may apply the measurement relaxation during time T.

Figure 7:
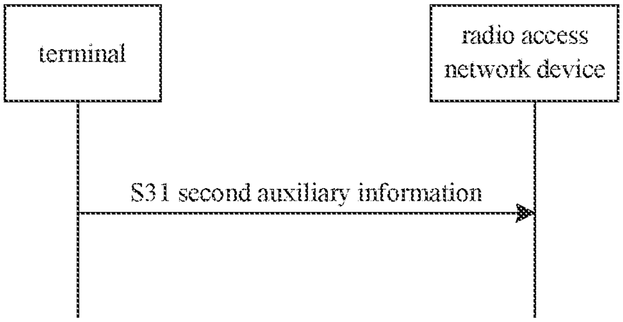
FIG. 7 is a flowchart of another cell positioning method illustrated according to an embodiment.

FIG. 7 is a flowchart of a cell positioning method illustrated according to an embodiment. As shown in FIG. 7, the cell positioning method is applied to a terminal, and includes the following step S31.

At step S31, second auxiliary information is sent to the radio access network device.

In an embodiment of the present disclosure, the second auxiliary information is used for indicating an area range for applying the cell measurement relaxation. It is further understood that the second auxiliary information may be area-related auxiliary information reporting the area range in which the terminal applies the measurement relaxation. For example, the terminal is configured with the measurement relaxation in the range of the radio access network device (e.g., the base station).

It should be noted that in an embodiment of the present disclosure, the first auxiliary information and the second auxiliary information may be reported at the same time or may be reported based on different times. Moreover, when reporting the first auxiliary information and the second auxiliary information, the reporting may be based on the request information or based on other signaling, and the present disclosure is not specifically limited herein.

Figure 8:
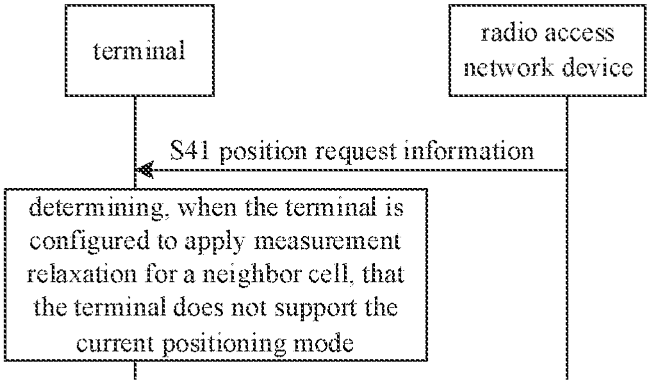
FIG. 8 is a flowchart of another cell positioning method illustrated according to an embodiment.

FIG. 8 is a flowchart of a cell positioning method illustrated according to an embodiment. As shown in FIG. 8, the cell positioning method is applied to a terminal, and includes the following step S41.

At step S41, when position request information sent by the radio access network device is received and the terminal is configured to apply measurement relaxation for a neighbor cell, it is determined that the terminal does not support the current positioning mode.

In an embodiment of the present disclosure, the position request information includes and is used for requesting the terminal to report a positioning parameter required for the current positioning mode, and the positioning parameter includes a measurement result of the neighbor cell.

In some embodiments of the present disclosure, the radio access network device sends the position request information to the terminal for requesting the terminal to report the positioning parameter required for the current positioning mode. The positioning parameter required for the current positioning mode includes at least the measurement result of the neighbor cell, such as an RSRP measurement result of the neighbor cell.

In an embodiment of the present disclosure, if the terminal is configured by the radio access network device to apply the measurement relaxation for the neighbor cell, the terminal increases the measurement period for performing the measurement for the neighbor cell. In other words, the terminal does not support the measurement of the RSRP for the neighbor cell for a specified period of time.

Figure 9:
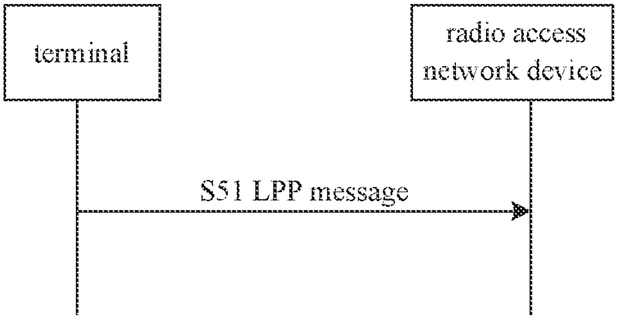
FIG. 9 is a flowchart of another cell positioning method illustrated according to an embodiment.

FIG. 9 is a flowchart of a cell positioning method illustrated according to an embodiment. As shown in FIG. 9, the cell positioning method is applied to a terminal, and includes the following step S51.

At step S51, an LPP message is sent to the radio access network device.

In an embodiment of the present disclosure, the LPP message includes the request information. The terminal sends the LPP message, so as to send the request information to the radio access network device.

In an embodiment of the present disclosure, the LPP message is sent through small data transmission (SDT), and the terminal is in a radio resource control (RRC) inactive state.

Figure 10:
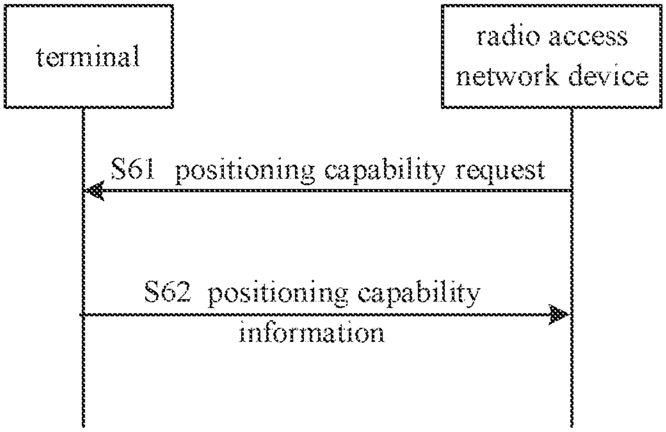
FIG. 10 is a flowchart of another cell positioning method illustrated according to an embodiment.

FIG. 10 is a flowchart of a cell positioning method illustrated according to an embodiment. As shown in FIG. 10, the cell positioning method is applied to a terminal, and includes the following steps S61 to S62.

At step S61, a positioning capability request sent by the radio access network device is received.

At step S62, positioning capability information is sent to the radio access network device.

In an embodiment of the present disclosure, the positioning capability information is used for indicating a positioning mode not supported by the terminal. Further, the terminal determines the positioning capability not supported by the terminal and reports the positioning capability of the terminal to the radio access network device. The positioning capability reported by the terminal does not include the positioning capability not supported by the terminal. For example, the terminal is currently configured with a measurement relaxation rule by the radio access network device, and with the measurement relaxation configured, the terminal does not support the E-CID positioning capability; and when reporting the positioning capability of the terminal, the reported positioning capability does not include the E-CID positioning capability. When reporting the positioning capability of the terminal, the reporting may be done via an LPP provide capabilities message, which is, of course, only an example and is not a specific limitation of the reporting of the positioning capability of the embodiments of the present disclosure.

Figure 11:
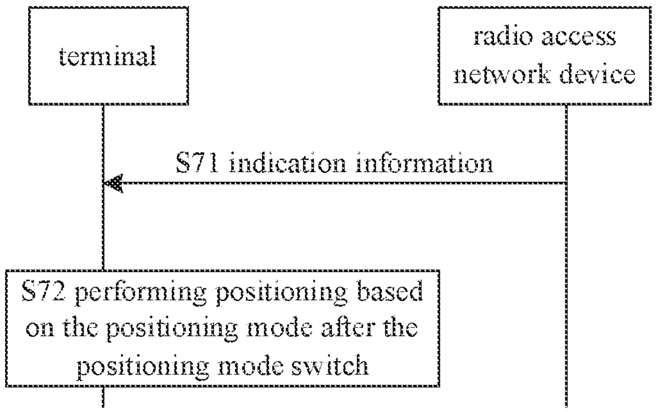
FIG. 11 is a flowchart of another cell positioning method illustrated according to an embodiment.

FIG. 11 is a flowchart of a cell positioning method illustrated according to an embodiment. As shown in FIG. 11, the cell positioning method is applied to a terminal, and includes the following steps S71 to S72.

At step S71, indication information sent by the radio access network device is received.

In an embodiment of the present disclosure, the indication information is used for indicating a positioning mode after the positioning mode switch.

At step S72, positioning is performed based on the positioning mode after the positioning mode switch.

In an embodiment of the present disclosure, the terminal, after receiving the indication information sent by the radio access network device, determines to perform positioning mode switch for the current positioning mode, and performs positioning based on the positioning mode after the positioning mode switch.

Based on the same/similar idea, the embodiments of the present disclosure also provide a cell positioning method.

Figure 12:
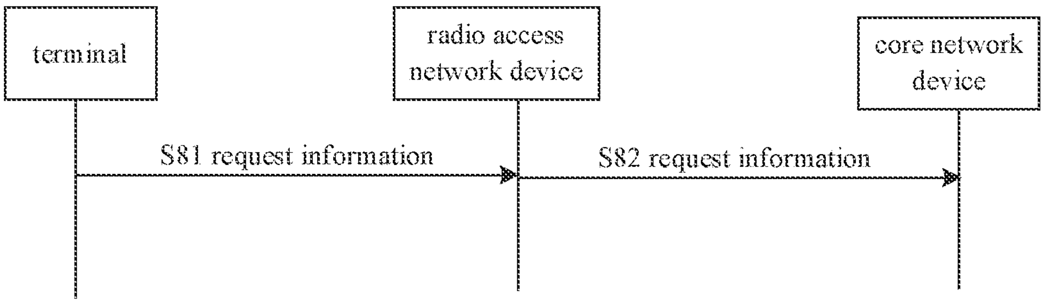
FIG. 12 is a flowchart of another cell positioning method illustrated according to an embodiment.

FIG. 12 is a flowchart of a cell positioning method illustrated according to an embodiment. As shown in FIG. 12, the cell positioning method is applied to a radio access network device, and includes the following steps S81 to S82.

At step S81, request information sent by a terminal is received.

In an embodiment of the present disclosure, the request information is used for requesting a core network device to perform positioning mode switch for the terminal.

At step S82, the request information is sent to the core network device.

In an embodiment of the present disclosure, the radio access network device receives the request information sent by the terminal, and the request information is used for requesting the core network device to perform positioning mode switch for the terminal. Further, if the terminal does not currently support the positioning mode determined by the core network device (e.g., a positioning server of the core network), the request information is sent to the radio access network device to request to switch the current positioning mode. The current positioning mode, determined by the core network device, that is not supported by the terminal may be an E-CID positioning mode.

Through the cell positioning method provided by the embodiments of the present disclosure, the request information for the positioning mode switch can be sent to the radio access network device when it is determined that the terminal does not support the current positioning mode, causing the core network device to switch the current positioning mode. This avoids the problem of inaccurate or impossible positioning caused by the terminal performing positioning based on an unsupported positioning mode, thereby improving the accuracy of positioning.

In an embodiment of the present disclosure, the request information includes at least one of:

a positioning mode supported by the terminal;

a positioning mode not supported by the terminal; or a reason for the terminal to request the positioning mode switch.

The positioning mode that is not supported by the terminal included in the request information may be the E-CID positioning mode. The reason for the terminal to request the positioning mode switch included in the request information may be that the terminal is applying measurement relaxation. In other words, the terminal is configured with measurement relaxation within a specified time range.

In an embodiment of the present disclosure, the reason for the terminal to request the positioning mode switch includes the radio access network device configuring cell measurement relaxation for the terminal. The cell measurement relaxation is used for configuring the terminal to increase a measurement period for performing measurement for a neighbor cell.

Figure 13:
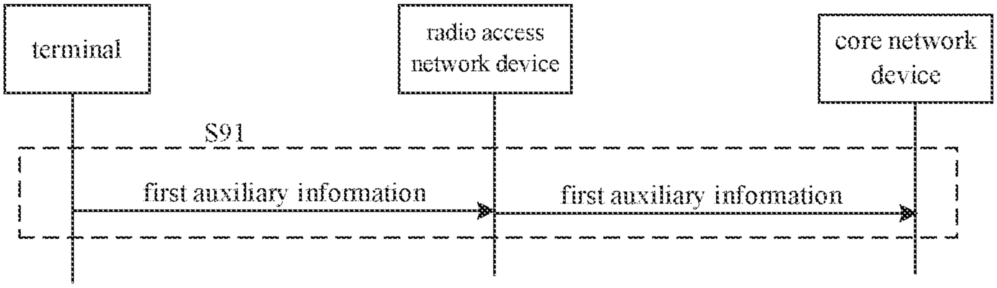
FIG. 13 is a flowchart of another cell positioning method illustrated according to an embodiment.

FIG. 13 is a flowchart of a cell positioning method illustrated according to an embodiment. As shown in FIG. 13, the cell positioning method is applied to a radio access network device, and includes the following step S91.

At step S91, first auxiliary information sent by the terminal is received, and the first auxiliary information is sent to the core network device.

In an embodiment of the present disclosure, the first auxiliary information is used for indicating a time range for applying the cell measurement relaxation. It is further understood that the first auxiliary information is used for indicating the terminal to apply measurement relaxation within the specified time range. Based on the first auxiliary information, the radio access network device may receive time-related auxiliary information for the application of the measurement relaxation by the terminal. For example, the terminal may apply the measurement relaxation during time T. The first auxiliary information is then sent to the core network device.

Figure 14:
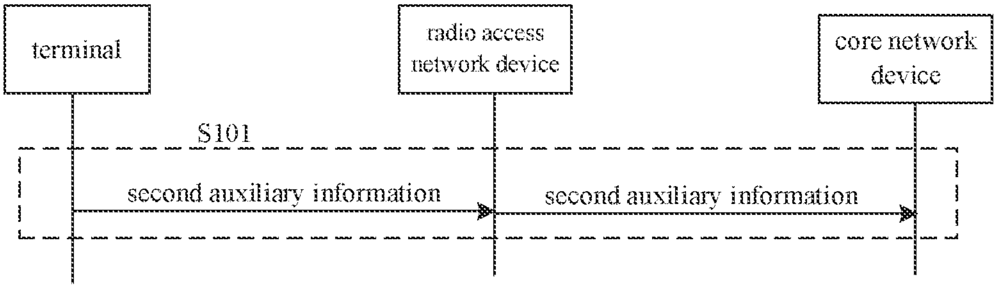
FIG. 14 is a flowchart of another cell positioning method illustrated according to an embodiment.

FIG. 14 is a flowchart of a cell positioning method illustrated according to an embodiment. As shown in FIG. 14, the cell positioning method is applied to a radio access network device, and includes the following step S101.

At step S101, second auxiliary information sent by the terminal is received, and the second auxiliary information is sent to the core network device.

In an embodiment of the present disclosure, the second auxiliary information is used for indicating an area range for applying the cell measurement relaxation. It is further understood that the radio access network device may receive, based on the second auxiliary information, area-related auxiliary information for the application of the measurement relaxation by the terminal. For example, the terminal is configured with the measurement relaxation in the range of the radio access network device (e.g., the base station). The second auxiliary information is then sent to the core network device.

It should be noted that in an embodiment of the present disclosure, the first auxiliary information and the second auxiliary information may be received at the same time or may be received based on different times. Moreover, when receiving the first auxiliary information and the second auxiliary information, the receiving may be based on the request information or based on other signaling. Similarly, the sending of the first auxiliary information and the second auxiliary information by the radio access network device to the core network device may be sent at the same time or may be sent based on different times. Moreover, when sending the first auxiliary information and the second auxiliary information to the core network device, the reporting may be based on the request information or based on other signaling, and the present disclosure is not specifically limited herein.

Figure 15:
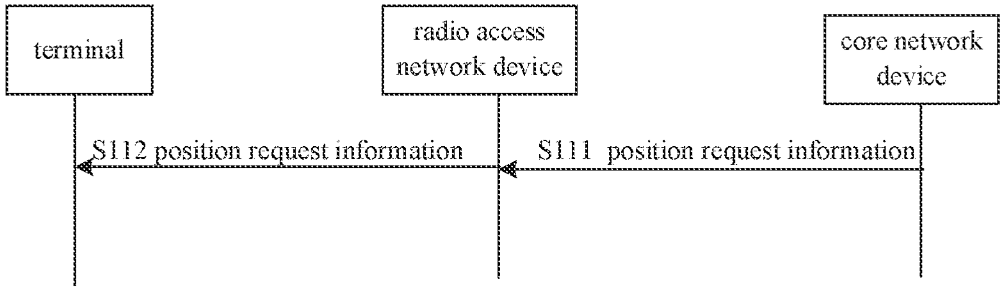
FIG. 15 is a flowchart of another cell positioning method illustrated according to an embodiment.

FIG. 15 is a flowchart of a cell positioning method illustrated according to an embodiment. As shown in FIG. 15, the cell positioning method is applied to a radio access network device, and includes the following steps S111 to S112.

At step S111, position request information sent by the core network device is received.

In an embodiment of the present disclosure, the position request information includes and is used for requesting the terminal to report a positioning parameter required for the current positioning mode, and the positioning parameter includes a measurement result of the neighbor cell, for example, an RSRP measurement result of the neighbor cell.

At step S112, the position request information is sent to the terminal.

In an embodiment of the present disclosure, the radio access network device, after receiving the position request information sent by the core network device, sends the position request information to the terminal.

Figure 16:
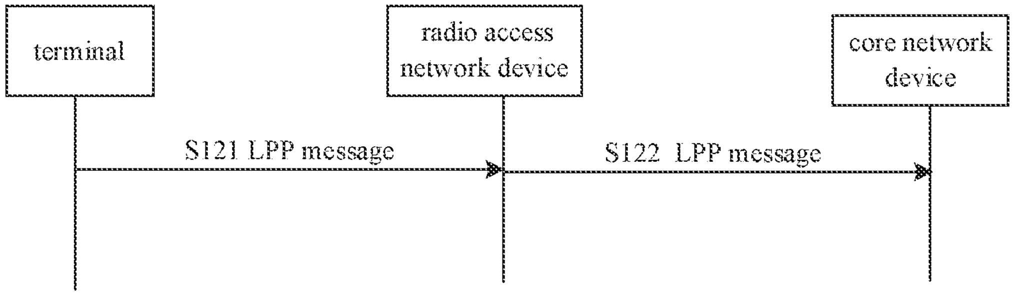
FIG. 16 is a flowchart of another cell positioning method illustrated according to an embodiment.

FIG. 16 is a flowchart of a cell positioning method illustrated according to an embodiment. As shown in FIG. 16, the cell positioning method is applied to a radio access network device, and includes the following steps S121 to S122.

At step S121, an LPP message sent by the terminal is received.

In an embodiment of the present disclosure, the LPP message includes the request information.

At step S122, the LPP message is sent to the core network device.

In an embodiment of the present disclosure, the radio access network device receives the LPP message sent by the terminal, and sends the LPP message to the core network device, so as to send the request information via the LPP message.

Figure 17:
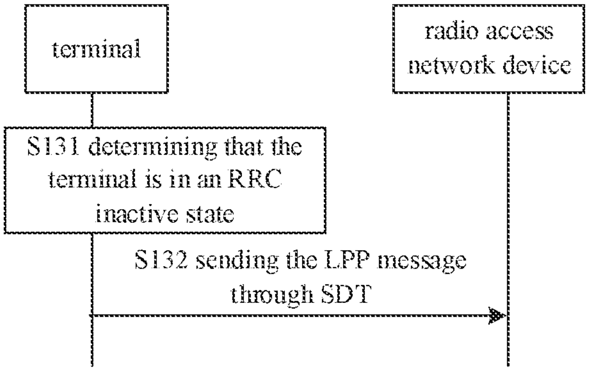
FIG. 17 is a flowchart of another cell positioning method illustrated according to an embodiment.

FIG. 17 is a flowchart of a cell positioning method illustrated according to an embodiment. As shown in FIG. 17, the cell positioning method is applied to a radio access network device, and includes the following steps S131 to S132.

At step S131, it is determined that the terminal is in an RRC inactive state.

At step S132, the LPP message sent by the terminal through SDT is received.

In an embodiment of the present disclosure, the LPP message includes the request information. The radio access network device determines a current state of the terminal and, if the terminal is currently in the RRC inactive state, determines to receive the LPP message sent by the terminal through the SDT.

Figure 18:
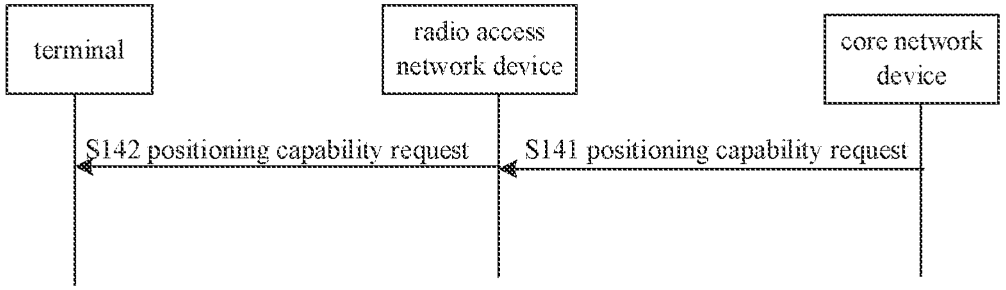
FIG. 18 is a flowchart of another cell positioning method illustrated according to an embodiment.

FIG. 18 is a flowchart of a cell positioning method illustrated according to an embodiment. As shown in FIG. 18, the cell positioning method is applied to a radio access network device, and includes the following steps S141 to S142.

At step S141, a positioning capability request sent by the core network device is received.

At step S142, the positioning capability request is sent to the terminal.

In an embodiment of the present disclosure, if the radio access network device receives the positioning capability request sent by the core network device, the radio access network device sends the positioning capability request to the terminal.

Figure 19:
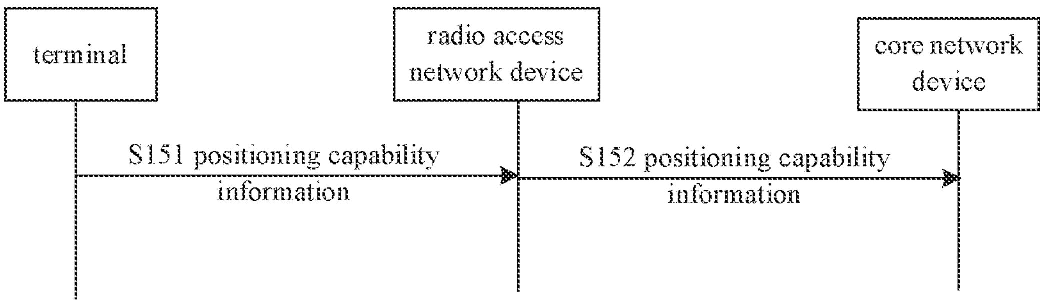
FIG. 19 is a flowchart of another cell positioning method illustrated according to an embodiment.

FIG. 19 is a flowchart of a cell positioning method illustrated according to an embodiment. As shown in FIG. 19, the cell positioning method is applied to a radio access network device, and includes the following steps S151 to S152.

At step S151, positioning capability information sent by the terminal is received.

At step S152, the positioning capability information is sent to the core network device.

In an embodiment of the present disclosure, if the radio access network device receives the positioning capability information sent by terminal to the core network device, the radio access network device sends the positioning capability information to the core network device. The positioning capability information is used for indicating a positioning mode not supported by the terminal.

Figure 20:
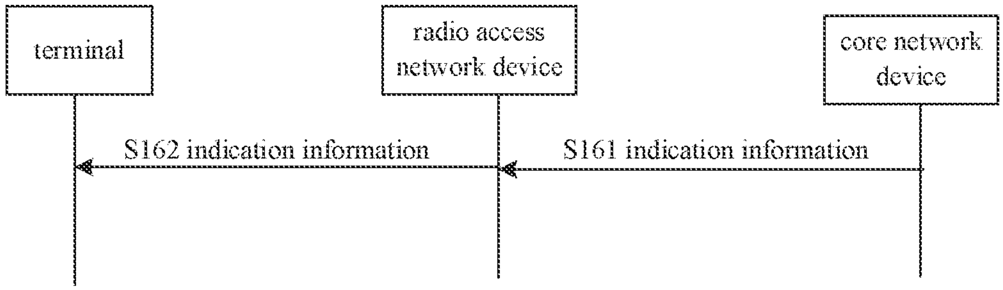
FIG. 20 is a flowchart of another cell positioning method illustrated according to an embodiment.

FIG. 20 is a flowchart of a cell positioning method illustrated according to an embodiment. As shown in FIG. 20, the cell positioning method is applied to a radio access network device, and includes the following steps S161 to S162.

At step S161, indication information sent by the core network device is received.

At step S162, the indication information is sent to the terminal.

In an embodiment of the present disclosure, the radio access network device receives the indication information sent by the core network device, and sends the indication information to the terminal. The indication information is used for indicating a positioning mode after the positioning mode switch.

Based on the same/similar idea, the embodiments of the present disclosure also provide a cell positioning method.

Figure 21:
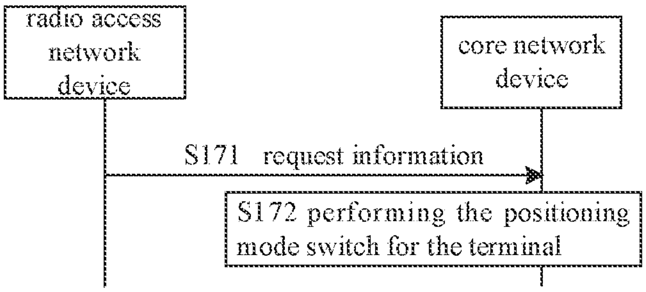
FIG. 21 is a flowchart of another cell positioning method illustrated according to an embodiment.

FIG. 21 is a flowchart of a cell positioning method illustrated according to an embodiment. As shown in FIG. 21, the cell positioning method is applied to a core network device, and includes the following steps S171 to S172.

At step S171, request information sent by a radio access network device is received.

In an embodiment of the present disclosure, the request information is used for requesting the core network device to perform positioning mode switch for the terminal. The core network device receives the request information sent by the radio access network device. The request information is used for requesting the core network device to switch the current positioning mode of the terminal. Further, if the terminal does not currently support the positioning mode determined by the core network device (e.g., a positioning server of the core network), the request information is sent to the radio access network device to request to switch the current positioning mode. The current positioning mode, determined by the core network device, that is not supported by the terminal may be an E-CID positioning mode.

At step S172, the positioning mode switch for the terminal is performed.

In an embodiment of the present disclosure, the core network device determines, based on the received request information, to perform the positioning mode switch for the terminal.

Through the cell positioning method provided by the embodiments of the present disclosure, the request information for the positioning mode switch can be sent to the radio access network device when it is determined that the terminal does not support the current positioning mode, causing the core network device to switch the current positioning mode. This avoids the problem of inaccurate or impossible positioning caused by the terminal performing positioning based on an unsupported positioning mode, thereby improving the accuracy of positioning.

In an embodiment of the present disclosure, the request information includes at least one of:

a positioning mode supported by the terminal;

a positioning mode not supported by the terminal; or a reason for the terminal to request the positioning mode switch.

The positioning mode that is not supported by the terminal included in the request information may be the E-CID positioning mode. The reason for the terminal to request the positioning mode switch included in the request information may be that the terminal is applying measurement relaxation. In other words, the terminal is configured with measurement relaxation within a specified time range.

In an embodiment of the present disclosure, the reason for the terminal to request the positioning mode switch includes the radio access network device configuring cell measurement relaxation for the terminal. The cell measurement relaxation is used for configuring the terminal to increase a measurement period for performing measurement for a neighbor cell.

Figure 22:
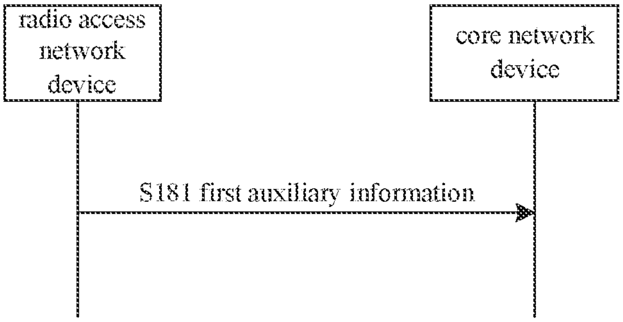
FIG. 22 is a flowchart of another cell positioning method illustrated according to an embodiment.

FIG. 22 is a flowchart of a cell positioning method illustrated according to an embodiment. As shown in FIG. 22, the cell positioning method is applied to a core network device, and includes the following step S181.

At step S181, first auxiliary information sent by the radio access network device is received.

In an embodiment of the present disclosure, the first auxiliary information is used for indicating a time range for applying the cell measurement relaxation. It is further understood that the first auxiliary information is used for indicating the terminal to apply measurement relaxation within the specified time range. Based on the first auxiliary information sent by the radio access network device, the core network device determines time-related auxiliary information for the application of the measurement relaxation by the terminal. For example, the terminal may apply the measurement relaxation during time T. Afterwards, it is determined that a positioning mode based on a measurement result of the neighbor cell is not to be used within the time range.

Figure 23:
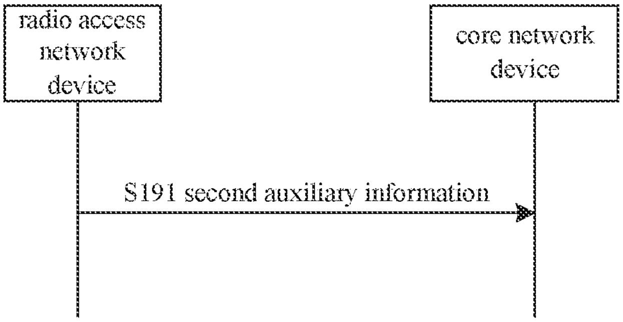
FIG. 23 is a flowchart of another cell positioning method illustrated according to an embodiment.

FIG. 23 is a flowchart of a cell positioning method illustrated according to an embodiment. As shown in FIG. 23, the cell positioning method is applied to a core network device, and includes the following step S191.

At step S191, second auxiliary information sent by the radio access network device is received.

In an embodiment of the present disclosure, the second auxiliary information is used for indicating an area range for applying the cell measurement relaxation. It is further understood that the core network device may determine, based on the second auxiliary information sent by the radio access network device, area-related auxiliary information for the application of the measurement relaxation by the terminal. For example, the terminal is configured with the measurement relaxation in the range of the radio access network device (e.g., the base station). Afterwards, it is determined that a positioning mode based on a measurement result of the neighbor cell is not to be used within the area range.

It should be noted that in an embodiment of the present disclosure, the first auxiliary information and the second auxiliary information may be received at the same time or may be received based on different times. Moreover, when receiving the first auxiliary information and the second auxiliary information, the receiving may be based on the request information or based on other signaling, and the present disclosure is not specifically limited herein.

Figure 24:
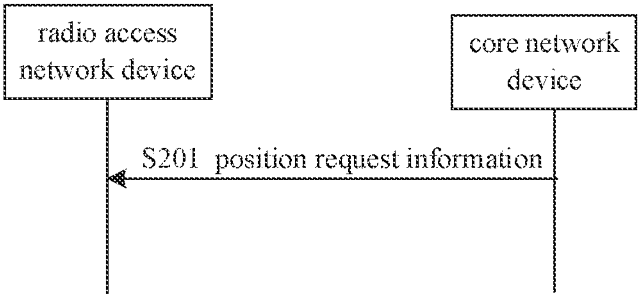
FIG. 24 is a flowchart of another cell positioning method illustrated according to an embodiment.

FIG. 24 is a flowchart of a cell positioning method illustrated according to an embodiment. As shown in FIG. 24, the cell positioning method is applied to a core network device, and includes the following step S201.

At step S201, position request information is sent to the radio access network device.

In an embodiment of the present disclosure, the position request information includes and is used for requesting the terminal to report a positioning parameter required for the current positioning mode, and the positioning parameter includes a measurement result of the neighbor cell.

In some embodiments of the present disclosure, the core network device sends the position request information to the radio access network device for requesting the terminal to report the positioning parameter required for the current positioning mode. The positioning parameter required for the current positioning mode includes at least the measurement result of the neighbor cell, such as an RSRP measurement result of the neighbor cell.

In an embodiment of the present disclosure, if the terminal is configured by the radio access network device to apply the measurement relaxation for the neighbor cell, the terminal increases the measurement period for performing the measurement for the neighbor cell. In other words, the terminal does not support the measurement of the RSRP for the neighbor cell for a specified period of time.

Figure 25:
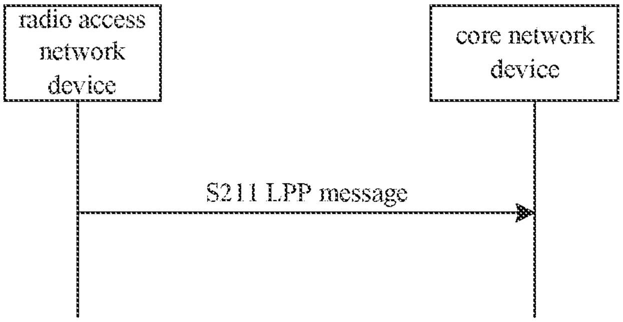
FIG. 25 is a flowchart of another cell positioning method illustrated according to an embodiment.

FIG. 25 is a flowchart of a cell positioning method illustrated according to an embodiment. As shown in FIG. 25, the cell positioning method is applied to a core network device, and includes the following step S211.

At step S211, an LPP message sent by the radio access network device is received.

In an embodiment of the present disclosure, the LPP message includes the request information.

In some embodiments of the present disclosure, if the terminal is in the RRC inactive state, it is determined that the LPP message sent by the radio access network device is received through the SDT.

Figure 26:
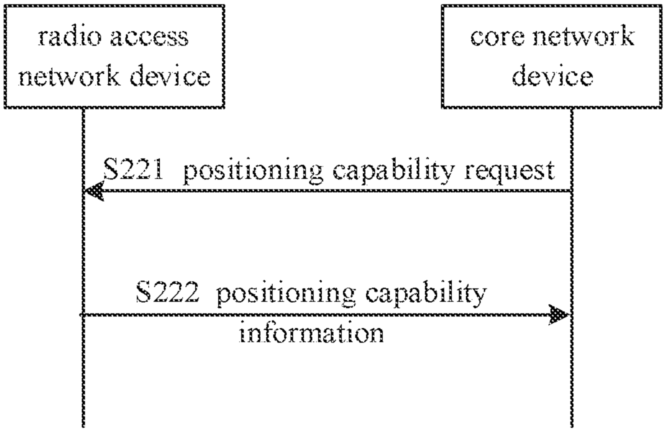
FIG. 26 is a flowchart of another cell positioning method illustrated according to an embodiment.

FIG. 26 is a flowchart of a cell positioning method illustrated according to an embodiment. As shown in FIG. 26, the cell positioning method is applied to a core network device, and includes the following steps S221 to S222.

At step S221, a positioning capability request is sent to the radio access network device.

At step S222, positioning capability information sent by the radio access network device is received.

In an embodiment of the present disclosure, the positioning capability information is used for indicating a positioning mode not supported by the terminal. The core network device sends the positioning capability request to the radio access network device, and determines the positioning capability supported by the terminal. The radio access network device reports the positioning capability of the terminal. The reported positioning capability of the terminal does not include the positioning capability not supported by the terminal. For example, if the terminal is currently configured with a measurement relaxation rule by the radio access network device, the terminal does not support the E-CID positioning capability; and when reporting the positioning capability of the terminal, the reported positioning capability does not include the E-CID positioning capability.

Figure 27:
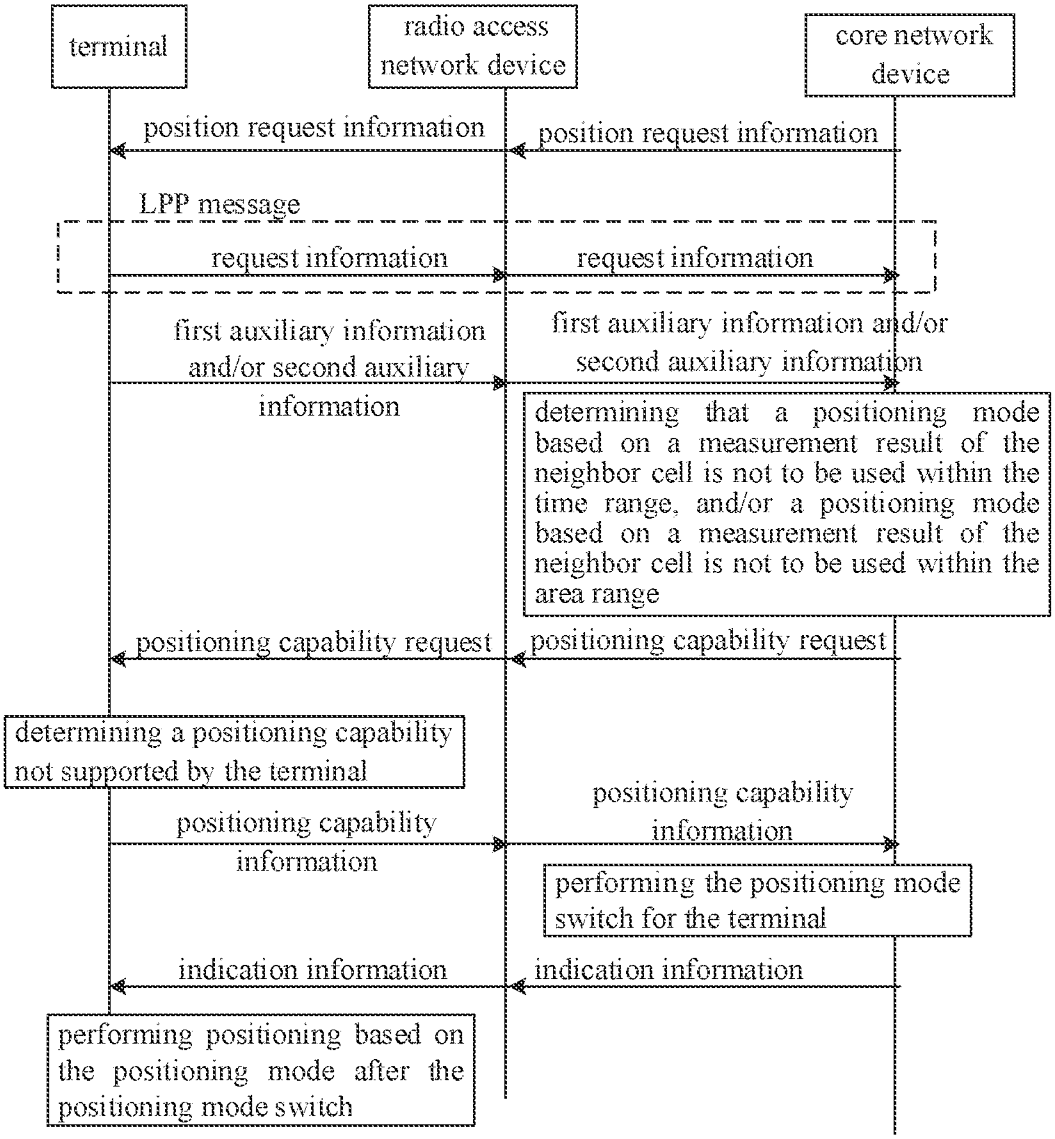
FIG. 27 is a flowchart of another cell positioning method illustrated according to an embodiment.

In some embodiments of the present disclosure, FIG. 27 is a flowchart of a cell positioning method illustrated according to an embodiment. As shown in FIG. 27, positioning mode switch for the terminal performed by the core network device may be realized based on an information interaction among the terminal, the radio access network device, and the core network device. Further, the core network device sends the position request information to the terminal through the radio access network device, and the terminal, which is configured with measure relaxation and is unable to use the current positioning mode (e.g., E-CID positioning), sends the request information to the core network device through the radio access network device to request the core network device to perform the positioning mode switch for the terminal. The terminal reports auxiliary information to the core network device. Based on the auxiliary information, the core network device determines that a positioning mode based on a measurement result of the neighbor cell is not to be used within the time range, and/or a positioning mode based on a measurement result of the neighbor cell is not to be used within the area range, and requests to obtain the positioning capability of the terminal from the terminal. The core network device sends the positioning capability request through the radio access network device, and after the terminal determines the unsupported positioning capability, the terminal sends the positioning capability information to the core network device through the radio access network device. After the core network device determines to perform the positioning mode switch for the terminal, the core network device sends the indication information to the terminal through the radio access network device. The terminal performs, according to the indication information, positioning by using the positioning mode after the positioning mode switch.

Based on the same/similar idea, the embodiments of the present disclosure also provide a cell positioning method.

Figure 28:
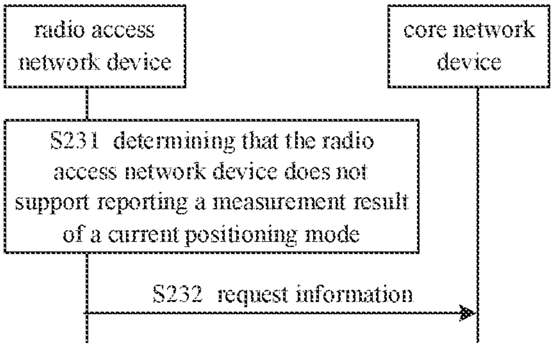
FIG. 28 is a flowchart of another cell positioning method illustrated according to an embodiment.

FIG. 28 is a flowchart of a cell positioning method illustrated according to an embodiment. As shown in FIG. 28, the cell positioning method is applied to a radio access network device, and includes the following steps S231 to S232.

At step S231, it is determined that the radio access network device does not support reporting a measurement result of a current positioning mode.

At step S232, request information is sent to a core network device.

In an embodiment of the present disclosure, the request information is used for requesting a core network device to perform positioning mode switch. Further, the radio access network device determines that the current state of the terminal does not support the current positioning mode, and thus determines that the measurement result of the current positioning mode cannot be obtained, and sends the request message to the core network device to request the core network device to perform positioning mode switch for the terminal.

Through the cell positioning method provided by the embodiments of the present disclosure, the core network device may be requested to perform the positioning mode switch for the terminal when it is determined that the terminal does not support the current positioning mode. This avoids the problem of inaccurate or impossible positioning caused by the terminal performing positioning based on an unsupported positioning mode, thereby improving the accuracy of positioning.

In an embodiment of the present disclosure, the request information includes at least one of:

- a positioning mode determined by the radio access network device for being supported by a terminal;
- a positioning mode determined by the radio access network device for being not supported by the terminal; or
- a reason determined by the radio access network device for requesting the positioning mode switch.

The positioning mode determined by the radio access network device for being supported by the terminal included in the request information may be the E-CID positioning mode. The reason determined by the radio access network device for requesting the positioning mode switch included in the request information may be that the terminal is applying measurement relaxation. In other words, the terminal is configured with measurement relaxation within a specified time range.

In an embodiment of the present disclosure, the reason for the terminal to request the positioning mode switch includes the radio access network device configuring cell measurement relaxation for the terminal. The cell measurement relaxation is used for configuring the terminal to increase a measurement period for performing measurement for a neighbor cell.

Figure 29:
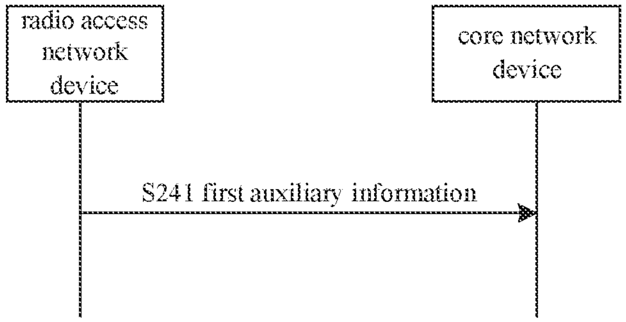
FIG. 29 is a flowchart of another cell positioning method illustrated according to an embodiment.

FIG. 29 is a flowchart of a cell positioning method illustrated according to an embodiment. As shown in FIG. 29, the cell positioning method is applied to a radio access network device, and includes the following step S241.

At step S241, first auxiliary information is sent to the core network device.

In an embodiment of the present disclosure, the first auxiliary information is used for indicating a time range for applying the cell measurement relaxation. It is further understood that the first auxiliary information is used for indicating the terminal to apply measurement relaxation within the specified time range. Based on the first auxiliary information, the radio access network device may receive time-related auxiliary information for the application of the measurement relaxation by the terminal. For example, the terminal may apply the measurement relaxation during time T. The first auxiliary information is then sent to the core network device.

Figure 30:
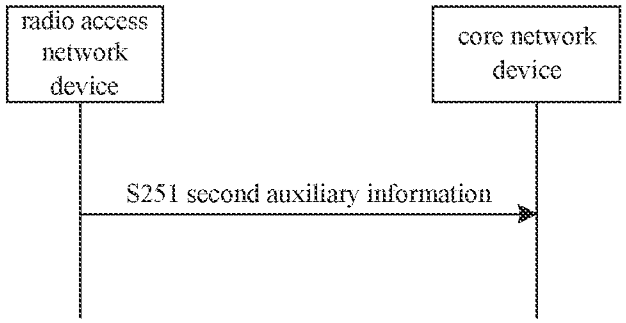
FIG. 30 is a flowchart of another cell positioning method illustrated according to an embodiment.

FIG. 30 is a flowchart of a cell positioning method illustrated according to an embodiment. As shown in FIG. 30, the cell positioning method is applied to a radio access network device, and includes the following step S251.

At step S251, second auxiliary information is sent to the core network device.

In an embodiment of the present disclosure, the second auxiliary information is used for indicating an area range for applying the cell measurement relaxation. It is further understood that the radio access network device may receive, based on the second auxiliary information, area-related auxiliary information for the application of the measurement relaxation by the terminal. For example, the terminal is configured with the measurement relaxation in the range of the radio access network device (e.g., the base station). The second auxiliary information is then sent to the core network device.

It should be noted that in an embodiment of the present disclosure, the sending of the first auxiliary information and the second auxiliary information by the radio access network device to the core network device may be sent at the same time or may be sent based on different times. Moreover, when sending the first auxiliary information and the second auxiliary information to the core network device, the reporting may be based on the request information or based on other signaling, and the present disclosure is not specifically limited herein.

Figure 31:
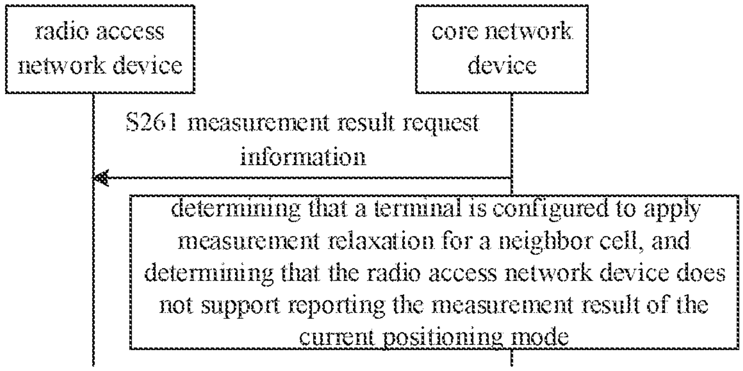
FIG. 31 is a flowchart of another cell positioning method illustrated according to an embodiment.

FIG. 31 is a flowchart of a cell positioning method illustrated according to an embodiment. As shown in FIG. 31, the cell positioning method is applied to a radio access network device, and includes the following step S261.

At step S261, when measurement result request information sent by the core network device is received and a terminal is configured by the radio access network device to apply measurement relaxation for a neighbor cell, it is determined that the radio access network device does not support reporting the measurement result of the current positioning mode.

In an embodiment of the present disclosure, the measurement result request information includes and is used for requesting the radio access network device to report a positioning parameter required for the current positioning mode, and the positioning parameter includes a measurement result of a neighbor cell. For example, the radio access network device configures the measurement relaxation for the terminal, and the current positioning mode of the terminal is the E-CID positioning mode, and after receiving the position request information sent by the core network device, it is determined that the core network device requests to obtain the RSRP measurement result of the neighbor cell. Since the measurement relaxation is configured for the terminal, the RSRP measurement result of the neighbor cell cannot be reported to the core network device, and thus it is determined that the radio access network device does not support reporting the measurement result of the current positioning mode.

Based on the above embodiments, the request information is sent to the core network device to determine that the core network device is requested to perform the positioning mode switch for the terminal.

Figure 32:
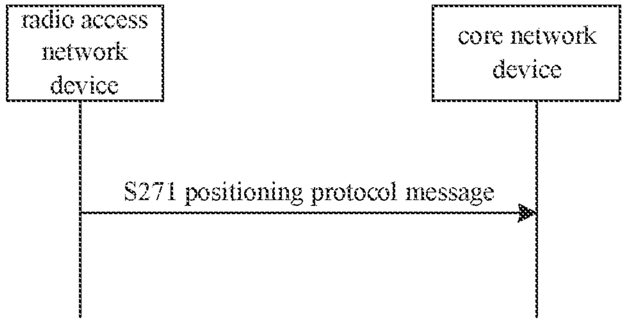
FIG. 32 is a flowchart of another cell positioning method illustrated according to an embodiment.

FIG. 32 is a flowchart of a cell positioning method illustrated according to an embodiment. As shown in FIG. 32, the cell positioning method is applied to a radio access network device, and includes the following step S271.

At step S271, a positioning protocol message is sent to the core network device.

In an embodiment of the present disclosure, the positioning protocol message includes the request information. The radio access network device may send the request information to the core network device through sending the positioning protocol message.

Figure 33:
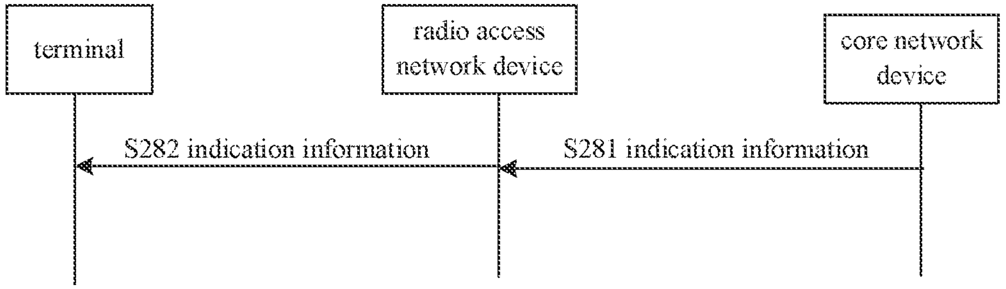
FIG. 33 is a flowchart of another cell positioning method illustrated according to an embodiment.

FIG. 33 is a flowchart of a cell positioning method illustrated according to an embodiment. As shown in FIG. 33, the cell positioning method is applied to a radio access network device, and includes the following steps S281 to S282.

At step S281, indication information sent by the core network device is received.

In an embodiment of the present disclosure, the indication information is used for indicating a positioning mode after the positioning mode switch.

At step S282, the indication information is sent to the terminal.

In an embodiment of the present disclosure, the radio access network device receives the indication information sent by the core network device for the positioning mode switch, and sends the indication information to the terminal to indicate the terminal to switch the current positioning mode and perform positioning based on the positioning mode after the positioning mode switch.

Based on the same/similar idea, the embodiments of the present disclosure also provide a cell positioning method.

Figure 34:
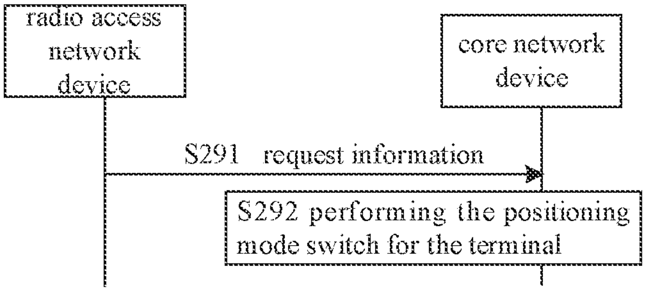
FIG. 34 is a flowchart of another cell positioning method illustrated according to an embodiment.

FIG. 34 is a flowchart of a cell positioning method illustrated according to an embodiment. As shown in FIG. 34, the cell positioning method is applied to a core network device, and includes the following steps S291 to S292.

At step S291, request information sent by a radio access network device is received.

In an embodiment of the present disclosure, the request information is used for requesting the core network device to perform positioning mode switch. Further, the core network device receives the request information sent by the radio access network device, and determines that the current state of the terminal does not support the current positioning mode, and thus determines that the measurement result of the current positioning mode cannot be obtained, and the request message is sent to the core network device to request the core network device to perform positioning mode switch for the terminal.

At step S292, the positioning mode switch for a terminal is performed.

In an embodiment of the present disclosure, the core network device determines, based on the received request information, to perform the positioning mode switch for the terminal.

Through the cell positioning method provided by the embodiments of the present disclosure, the positioning mode switch for the terminal can be performed based on the request information sent by the radio access network device when it is determined that the terminal does not support the current positioning mode. This avoids the problem of inaccurate or impossible positioning caused by the terminal performing positioning based on an unsupported positioning mode, thereby improving the accuracy of positioning.

In an embodiment of the present disclosure, the request information includes at least one of:

- a positioning mode determined by the radio access network device for being supported by a terminal;
- a positioning mode determined by the radio access network device for being not supported by the terminal; or
- a reason determined by the radio access network device for requesting the positioning mode switch.

The positioning mode determined by the radio access network device for being not supported by the terminal included in the request information may be the E-CID positioning mode. The reason determined by the radio access network device for requesting the positioning mode switch included in the request information may be that the terminal is applying measurement relaxation. In other words, the terminal is configured with measurement relaxation within a specified time range.

In an embodiment of the present disclosure, the reason for the terminal to request the positioning mode switch includes the radio access network device configuring cell measurement relaxation for the terminal. The cell measurement relaxation is used for configuring the terminal to increase a measurement period for performing measurement for a neighbor cell.

Figure 35:
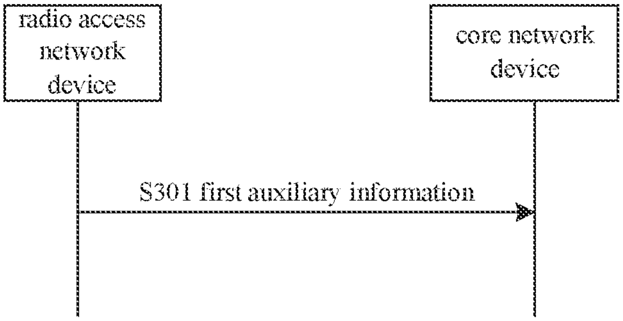
FIG. 35 is a flowchart of another cell positioning method illustrated according to an embodiment.

FIG. 35 is a flowchart of a cell positioning method illustrated according to an embodiment. As shown in FIG. 35, the cell positioning method is applied to a core network device, and includes the following step S301.

At step S301, first auxiliary information sent by the radio access network device is received.

In an embodiment of the present disclosure, the first auxiliary information is used for indicating a time range for applying the cell measurement relaxation. It is further understood that the first auxiliary information is used for indicating the terminal to apply measurement relaxation within the specified time range. Based on the first auxiliary information, the radio access network device may receive time-related auxiliary information for the application of the measurement relaxation by the terminal. For example, the terminal may apply the measurement relaxation during time T. Afterwards, it is determined that a positioning mode based on a measurement result of the neighbor cell is not to be used within the time range.

Figure 36:
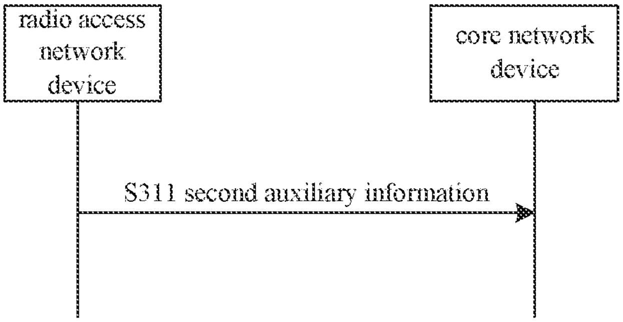
FIG. 36 is a flowchart of another cell positioning method illustrated according to an embodiment.

FIG. 36 is a flowchart of a cell positioning method illustrated according to an embodiment. As shown in FIG.

36, the cell positioning method is applied to a core network device, and includes the following step S311.

At step S311, second auxiliary information sent by the radio access network device is received.

In an embodiment of the present disclosure, the second auxiliary information is used for indicating an area range for applying the cell measurement relaxation. It is further understood that the radio access network device may receive, based on the second auxiliary information, area-related auxiliary information for the application of the measurement relaxation by the terminal. For example, the terminal is configured with the measurement relaxation in the range of the radio access network device (e.g., the base station). Afterwards, it is determined that a positioning mode based on a measurement result of the neighbor cell is not to be used within the area range.

It should be noted that in an embodiment of the present disclosure, the first auxiliary information and the second auxiliary information sent by the radio access network device may be received at the same time or may be received based on different times. Moreover, when receiving the first auxiliary information and the second auxiliary information, the receiving may be based on the request information or based on other signaling, and the present disclosure is not specifically limited herein.

Figure 37:
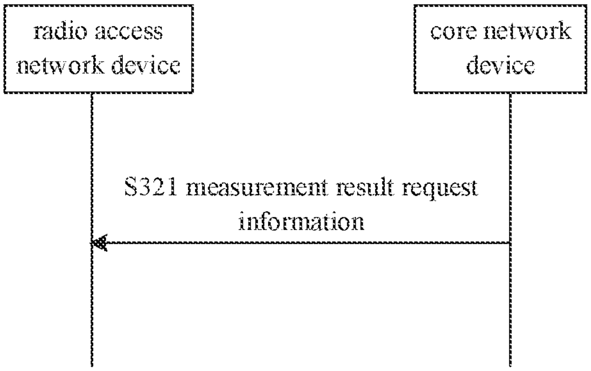
FIG. 37 is a flowchart of another cell positioning method illustrated according to an embodiment.

FIG. 37 is a flowchart of a cell positioning method illustrated according to an embodiment. As shown in FIG. 37, the cell positioning method is applied to a core network device, and includes the following step S321.

At step S321, measurement result request information is sent to the radio access network device.

In an embodiment of the present disclosure, the measurement result request information includes and is used for requesting the radio access network device to report a positioning parameter required for the current positioning mode, and the positioning parameter includes a measurement result of a neighbor cell. For example, the radio access network device configures the measurement relaxation for the terminal, and the current positioning mode of the terminal is the E-CID positioning mode, and after receiving the position request information sent by the core network device, it is determined that the core network device requests to obtain the RSRP measurement result of the neighbor cell, and it is determined that the radio access network device does not support reporting the measurement result of the current positioning mode.

Figure 38:
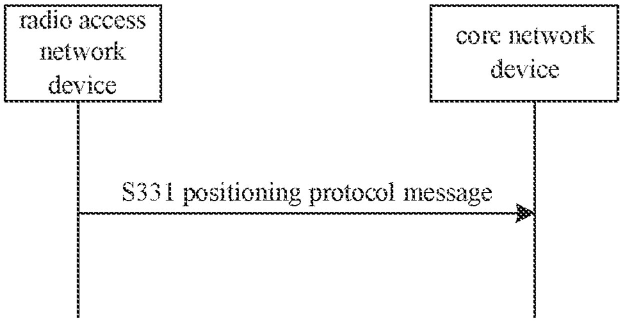
FIG. 38 is a flowchart of another cell positioning method illustrated according to an embodiment.

FIG. 38 is a flowchart of a cell positioning method illustrated according to an embodiment. As shown in FIG. 38, the cell positioning method is applied to a core network device, and includes the following step S331.

At step S331, a positioning protocol message sent by the radio access network device is received.

In an embodiment of the present disclosure, the positioning protocol message includes the request information. The core network device receives the request information through the positioning protocol message sent by the radio access network device.

Figure 39:
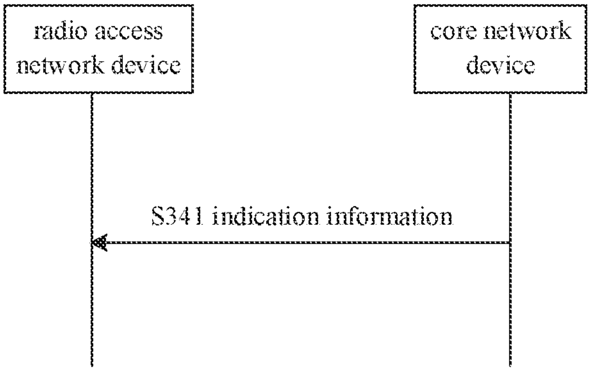
FIG. 39 is a flowchart of another cell positioning method illustrated according to an embodiment.

FIG. 39 is a flowchart of a cell positioning method illustrated according to an embodiment. As shown in FIG. 39, the cell positioning method is applied to a core network device, and includes the following step S341.

At step S341, indication information is sent to the radio access network device.

In an embodiment of the present disclosure, the indication information is used for indicating a positioning mode after the positioning mode switch. The radio access network device receives the indication information sent by the core network device for the positioning mode switch, and sends the indication information to the terminal to indicate the terminal to switch the current positioning mode and perform positioning based on the positioning mode after the positioning mode switch.

Figure 40:
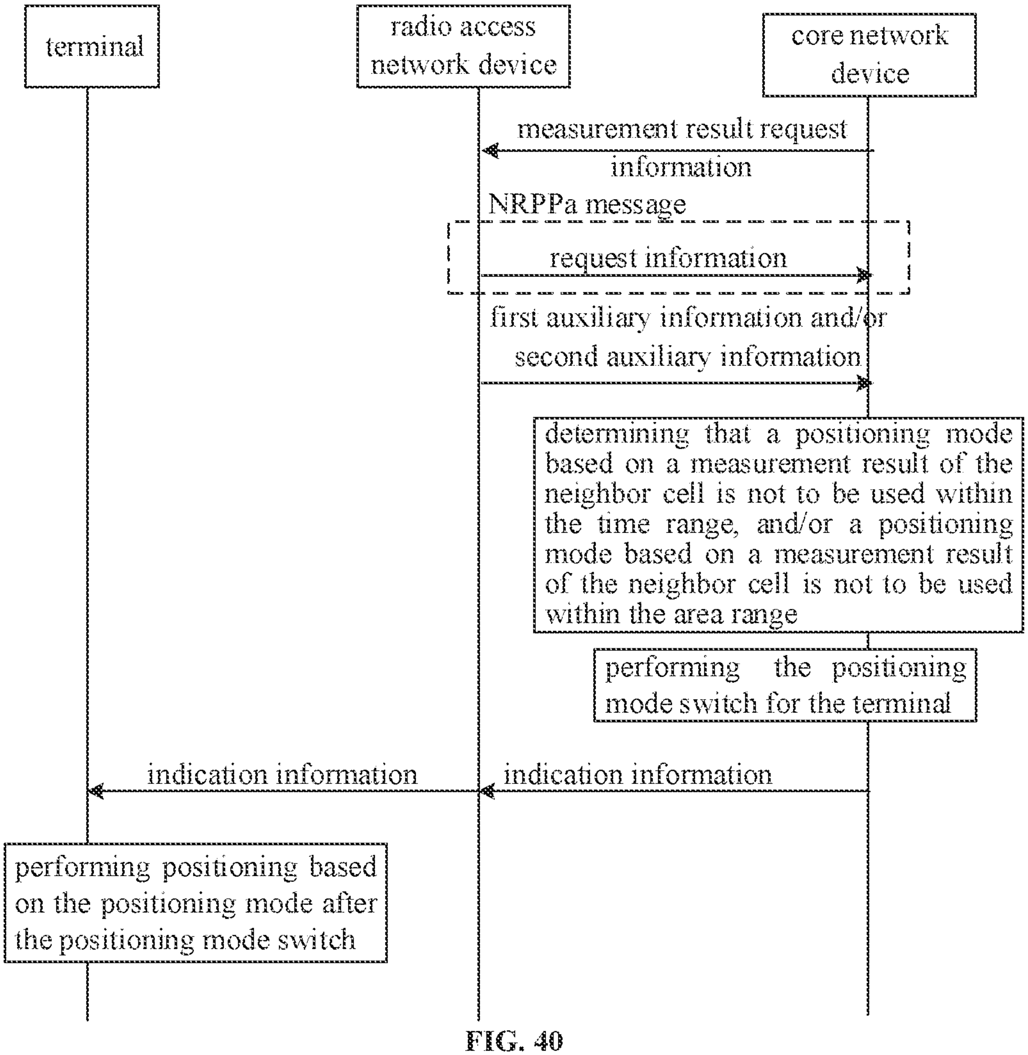
FIG. 40 is a flowchart of another cell positioning method illustrated according to an embodiment.

In some embodiments of the present disclosure, FIG. 40 is a flowchart of a cell positioning method illustrated according to an embodiment. As shown in FIG. 40, positioning mode switch for the terminal performed by the core network device may be realized based on an information interaction among the terminal, the radio access network device, and the core network device. Further, the core network device sends the measurement result request information to radio access network device. The radio access network device determines that the terminal is currently applying the measurement relaxation and does not support providing the measurement result of the neighbor cell requested by the measurement result request information. The radio access network device sends the request information to the core network device through the positioning protocol message and reports the auxiliary information. The core network device determines, based on the request information and auxiliary information sent by the radio access network device, that a positioning mode based on a measurement result of the neighbor cell is not to be used within the time range, and/or a positioning mode based on a measurement result of the neighbor cell is not to be used within the area range, and performs the positioning mode switch for the terminal. Afterwards, the core network device sends the indication information to the radio access network device. After receiving the indication information sent by the core network device, the radio access network device sends the indication information to the terminal, indicating the terminal to perform positioning based on the positioning mode after the positioning mode switch.

Based on the same/similar idea, the embodiments of the present disclosure also provide a cell positioning apparatus.

It can be understood that the cell positioning apparatus provided in the embodiments of the present disclosure includes hardware structures and/or software modules corresponding to the execution of various functions in order to achieve the above functions. Combining the units and algorithm steps of each example disclosed in the embodiments of the present disclosure, the embodiments of the present disclosure may be implemented in the form of hardware or a combination of hardware and computer software. Whether a certain function is executed in hardware or computer software driven hardware depends on the specific application and design constraints of the technical solution. Those skilled in the art may use different methods to implement the described functions for each specific application, but such implementation should not be considered beyond the scope of the technical solution of the embodiments of the present disclosure.

Figure 41:
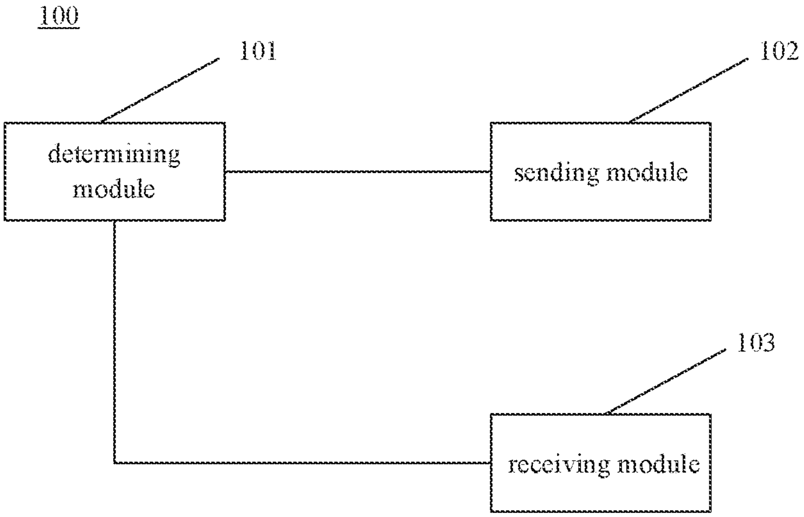
FIG. 41 is a block diagram of a cell positioning apparatus illustrated according to an embodiment.

FIG. 41 is a block diagram of a cell positioning apparatus illustrated according to an embodiment. Referring to FIG. 41, the cell positioning apparatus 100 is executed by a terminal, and includes a determining module 101 and a sending module 102.

The determining module 101 is configured to determine that the terminal does not support a current positioning mode. The sending module 102 is configured to send request information to a radio access network device. The request information is used for requesting a core network device to perform positioning mode switch for the terminal.

In an embodiment of the present disclosure, the request information includes at least one of:

a positioning mode supported by the terminal;
a positioning mode not supported by the terminal; or
a reason for the terminal to request the positioning mode switch.

In an embodiment of the present disclosure, the reason for the terminal to request the positioning mode switch includes the terminal being configured with cell measurement relaxation. The cell measurement relaxation is used for indicating the terminal to increase a measurement period for performing measurement for a neighbor cell.

In an embodiment of the present disclosure, the sending module 102 is further configured to: send first auxiliary information to the radio access network device, where the first auxiliary information is used for indicating a time range for applying the cell measurement relaxation; and/or send second auxiliary information to the radio access network device, where the second auxiliary information is used for indicating an area range for applying the cell measurement relaxation.

In an embodiment of the present disclosure, the determining module 101 is specifically configured to: determine, when position request information sent by the radio access network device is received and the terminal is configured to apply measurement relaxation for a neighbor cell, that the terminal does not support the current positioning mode. The position request information includes and is used for requesting the terminal to report a positioning parameter required for the current positioning mode, and the positioning parameter includes a measurement result of the neighbor cell.

In an embodiment of the present disclosure, the sending module 102 is specifically configured to: send a positioning protocol (LPP) message to the radio access network device. The LPP message includes the request information.

In an embodiment of the present disclosure, the sending module 102 is specifically configured to: send the LPP message to the radio access network device through small data transmission (SDT). The terminal is in a radio resource control (RRC) inactive state.

In an embodiment of the present disclosure, the cell positioning apparatus further includes a receiving module 103.

The receiving module 103 is configured to: receive a positioning capability request sent by the radio access network device; and send positioning capability information to the radio access network device. The positioning capability information is used for indicating a positioning mode not supported by the terminal.

In an embodiment of the present disclosure, the receiving module 103 is further configured to receive indication information sent by the radio access network device, where the indication information is used for indicating a positioning mode after the positioning mode switch, and perform positioning based on the positioning mode after the positioning mode switch.

Figure 42:
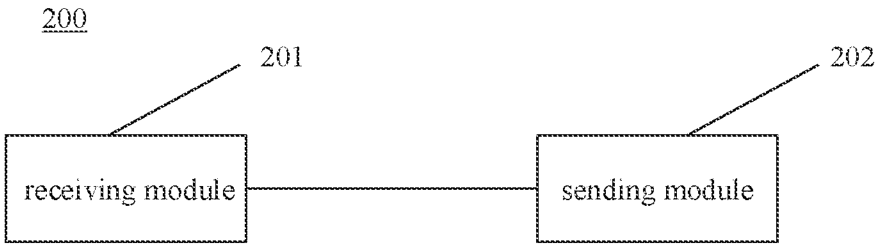
FIG. 42 is a block diagram of another cell positioning apparatus illustrated according to an embodiment.

FIG. 42 is a block diagram of a cell positioning apparatus illustrated according to an embodiment. Referring to FIG. 42, the cell positioning apparatus 200 is executed by a radio access network device, and includes a receiving module 201 and a sending module 202.

The receiving module 201 is configured to receive request information sent by a terminal. The request information is used for requesting a core network device to perform positioning mode switch for the terminal. The sending module 202 is configured to send the request information to the core network device.

In an embodiment of the present disclosure, the request information includes at least one of:

a positioning mode supported by the terminal;
a positioning mode not supported by the terminal; or
a reason for the terminal to request the positioning mode switch.

In an embodiment of the present disclosure, the reason for the terminal to request the positioning mode switch includes the radio access network device configuring cell measurement relaxation for the terminal. The cell measurement relaxation is used for indicating the terminal to increase a measurement period for performing measurement for a neighbor cell.

In an embodiment of the present disclosure, the sending module 202 is further configured to: receive first auxiliary information sent by the terminal, and send the first auxiliary information to the core network device, where the first auxiliary information is used for indicating a time range for applying the cell measurement relaxation; and/or receive second auxiliary information sent by the terminal, and send the second auxiliary information to the core network device, where the second auxiliary information is used for indicating an area range for applying the cell measurement relaxation.

In an embodiment of the present disclosure, the receiving module 201 is further configured to receive position request information sent by the core network device, where the position request information includes and is used for requesting the terminal to report a positioning parameter required for a current positioning mode, and the positioning parameter includes a measurement result of a neighbor cell, and send the position request information to the terminal.

In an embodiment of the present disclosure, the receiving module 201 is specifically configured to receive an LPP message sent by the terminal. The LPP message includes the request information.

The sending module 202 is specifically configured to send the LPP message to the core network device.

In an embodiment of the present disclosure, the receiving module 201 is specifically configured to determine that the terminal is in an RRC inactive state, and receive the LPP message sent by the terminal through SDT. The LPP message includes the request information.

In an embodiment of the present disclosure, the receiving module 201 is further configured to: receive a positioning capability request sent by the core network device; and send the position capability request to the terminal.

In an embodiment of the present disclosure, the receiving module 201 is further configured to: receive positioning capability information sent by the terminal, where the positioning capability information is used for indicating a positioning mode not supported by the terminal; and send the positioning capability information to the core network device.

In an embodiment of the present disclosure, the receiving module 201 is further configured to: receive indication information sent by the core network device, where the indication information is used for indicating a positioning mode after the positioning mode switch; and send the indication information to the terminal.

Figure 43:
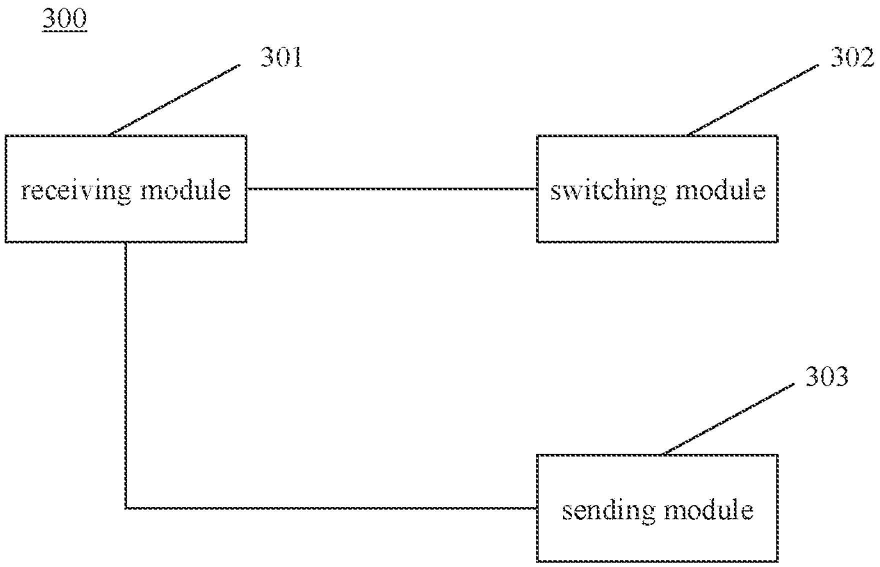
FIG. 43 is a block diagram of another cell positioning apparatus illustrated according to an embodiment.

FIG. 43 is a block diagram of a cell positioning apparatus illustrated according to an embodiment. Referring to FIG. 43, the cell positioning apparatus 300 is executed by a core network device, and includes a receiving module 301 and a switching module 302.

The receiving module 301 is configured to receive request information sent by a radio access network device. The request information is used for requesting the core network device to perform positioning mode switch for a terminal. The switching module 302 is configured to perform the positioning mode switch for the terminal.

In an embodiment of the present disclosure, the request information includes at least one of:

a positioning mode supported by the terminal;

a positioning mode not supported by the terminal; or a reason for the terminal to request the positioning mode switch.

In an embodiment of the present disclosure, the reason for the terminal to request the positioning mode switch includes the terminal being configured with cell measurement relaxation. The cell measurement relaxation is used for indicating the terminal to increase a measurement period for performing measurement for a neighbor cell.

In an embodiment of the present disclosure, the receiving module 301 is further configured to: receive first auxiliary information sent by the radio access network device, where the first auxiliary information is used for indicating a time range for applying the cell measurement relaxation; and/or receive second auxiliary information sent by the radio access network device, where the second auxiliary information is used for indicating an area range for applying the cell measurement relaxation.

In an embodiment of the present disclosure, the cell positioning apparatus further includes a sending module 303.

The sending module 303 is configured to send position request information to the radio access network device. The position request information includes and is used for requesting the terminal to report a positioning parameter required for a current positioning mode, and the positioning parameter includes a measurement result of a neighbor cell.

In an embodiment of the present disclosure, the receiving module 301 is further configured to: receive an LPP message sent by the radio access network device. The LPP message includes the request information.

In an embodiment of the present disclosure, the receiving module 301 is specifically configured to: receive the LPP message through SDT.

In an embodiment of the present disclosure, the sending module 303 is further configured to: send a positioning capability request to the radio access network device; and receive positioning capability information sent by the radio access network device. The positioning capability information is used for indicating a positioning mode not supported by the terminal.

Figure 44:
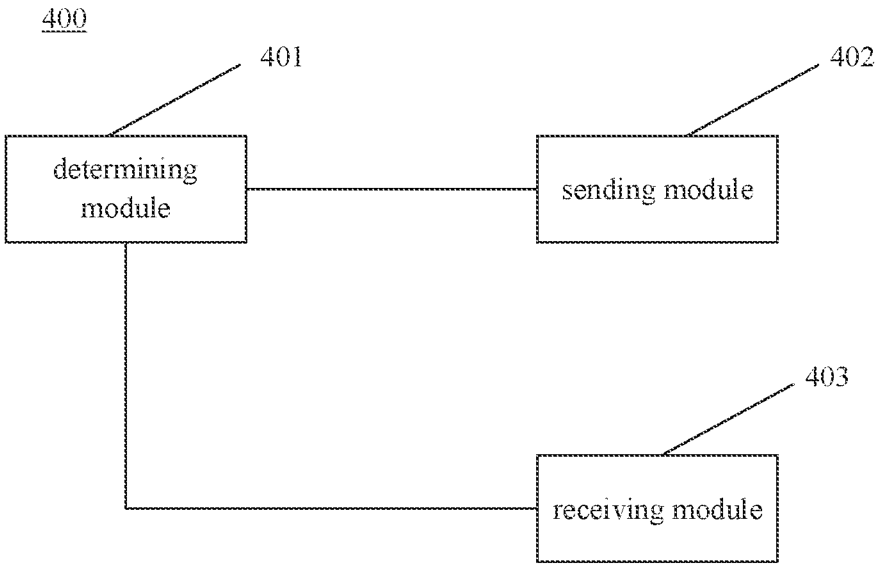
FIG. 44 is a block diagram of another cell positioning apparatus illustrated according to an embodiment.

FIG. 44 is a block diagram of a cell positioning apparatus illustrated according to an embodiment. Referring to FIG. 44, the cell positioning apparatus 400 is executed by a radio access network device, and includes a determining module 401 and a sending module 402.

The determining module 401 is configured to determine that the radio access network device does not support reporting a measurement result of a current positioning mode. The sending module 402 is configured to send request information to a core network device. The request information is used for requesting the core network device to perform positioning mode switch.

In an embodiment of the present disclosure, the request information includes at least one of:

a positioning mode determined by the radio access network device for being supported by a terminal;

a positioning mode determined by the radio access network device for being not supported by the terminal; or a reason determined by the radio access network device for requesting the positioning mode switch.

In an embodiment of the present disclosure, the reason determined by the radio access network device for requesting the positioning mode switch includes the radio access network device configuring cell measurement relaxation. The cell measurement relaxation is used for indicating the terminal to increase a measurement period for performing measurement for a neighbor cell.

In an embodiment of the present disclosure, the sending module 402 is further configured to: send first auxiliary information to the core network device, where the first auxiliary information is used for indicating a time range for applying the cell measurement relaxation, and/or send second auxiliary information to the core network device, where the second auxiliary information is used for indicating an area range for applying the cell measurement relaxation.

In an embodiment of the present disclosure, the determining module 401 is specifically configured to determine, when measurement result request information sent by the core network device is received and a terminal is configured by the radio access network device to apply measurement relaxation for a neighbor cell, that the radio access network device does not support reporting the measurement result of the current positioning mode. The measurement result request information includes and is used for requesting the radio access network device to report a positioning parameter required for the current positioning mode, and the positioning parameter includes a measurement result of a neighbor cell.

In an embodiment of the present disclosure, the sending module 402 is further configured to send a positioning protocol message to the core network device, where the positioning protocol message includes the request information.

In an embodiment of the present disclosure, the cell positioning apparatus further includes a receiving module 403.

The receiving module 403 is configured to: receive indication information sent by the core network device, where the indication information is used for indicating a positioning mode after the positioning mode switch; and send the indication information to the terminal.

Figure 45:
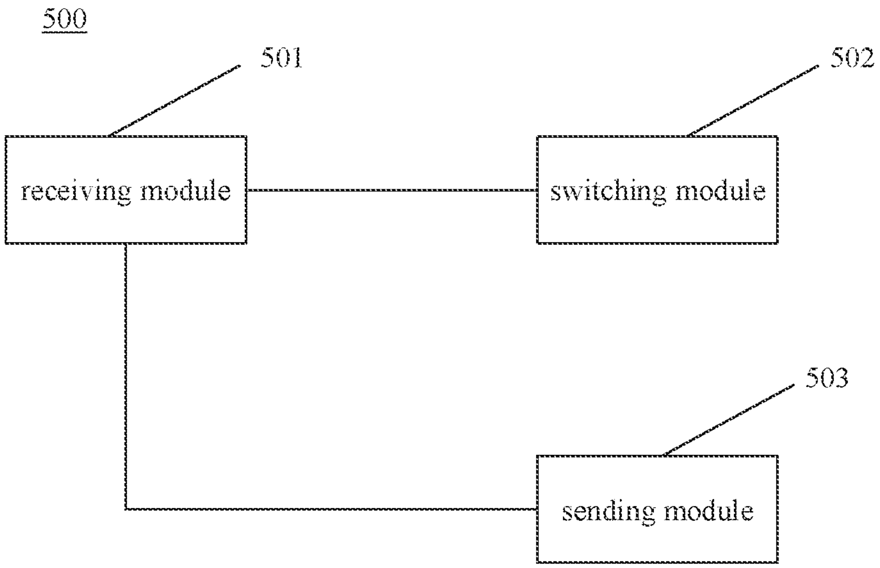
FIG. 45 is a block diagram of another cell positioning apparatus illustrated according to an embodiment.

FIG. 45 is a block diagram of a cell positioning apparatus illustrated according to an embodiment. Referring to FIG. 45, the cell positioning apparatus 500 is executed by a core network device, and includes a receiving module 501 and a switching module 502.

The receiving module 501 is configured to receive request information sent by a radio access network device. The request information is used for requesting the core network device to perform positioning mode switch. The switching module 502 is configured to perform the positioning mode switch for a terminal.

In an embodiment of the present disclosure, the request information includes at least one of:

a positioning mode determined by the radio access network device for being supported by the terminal;

a positioning mode determined by the radio access network device for being not supported by the terminal; or a reason determined by the radio access network device for requesting the positioning mode switch.

In an embodiment of the present disclosure, the reason determined by the radio access network device for requesting the positioning mode switch includes the radio access network device configuring cell measurement relaxation. The cell measurement relaxation is used for indicating the terminal to increase a measurement period for performing measurement for a neighbor cell.

In an embodiment of the present disclosure, the receiving module 501 is further configured to receive first auxiliary information sent by the radio access network device, where the first auxiliary information is used for indicating a time range for applying the cell measurement relaxation; and/or receive second auxiliary information sent by the radio access network device, where the second auxiliary information is used for indicating an area range for applying the cell measurement relaxation.

In an embodiment of the present disclosure, the cell positioning apparatus further includes a sending module 503.

The sending module 503 is configured to: send measurement result request information to the radio access network device. The measurement result request information includes and is used for requesting the radio access network device to report a positioning parameter required for a current positioning mode, and the positioning parameter includes a measurement result of a neighbor cell.

In an embodiment of the present disclosure, the receiving module 501 is specifically configured to: receive a positioning protocol message sent by the radio access network device. The positioning protocol message includes the request information.

In an embodiment of the present disclosure, the sending module 503 is further configured to: send indication information to the radio access network device. The indication information is used for indicating a positioning mode after the positioning mode switch.

With respect to the apparatus in the above embodiments, the specific manner in which the individual modules perform operations has been described in detail in the embodiments relating to the method, and will not be described in detail herein.

Figure 46:
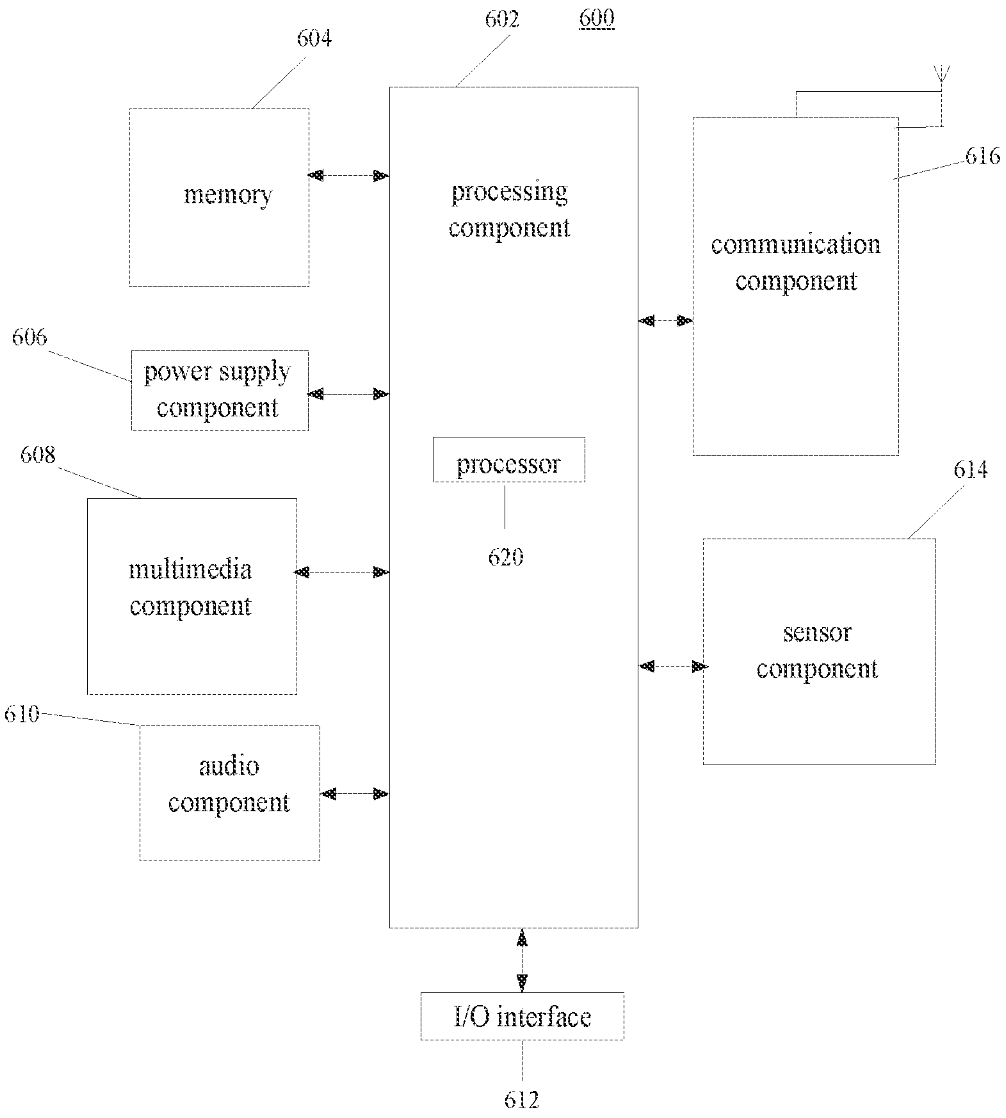
FIG. 46 is a block diagram of an apparatus for cell positioning illustrated according to an embodiment.

FIG. 46 is a block diagram of an apparatus 600 for cell positioning illustrated according to an embodiment. For example, the apparatus 600 may be a cell phone, a computer, a digital broadcast terminal, a message transceiver device, a game console, a tablet device, a medical device, a fitness device, a personal digital assistant, and the like.

Referring to FIG. 46, the apparatus 600 may include one or more of the following components a processing component 602, a memory 604, a power supply component 606, a multimedia component 608, an audio component 610, an input/output (I/O) interface 612, a sensor component 614, and a communication component 616.

The processing component 602 generally controls the overall operation of the apparatus 600, such as operations associated with display, telephone calls, data communication, camera operations, and recording operations. The processing component 602 may include one or more processors 620 to execute an instruction to complete all or some of the steps of the methods described above. In addition, the processing component 602 may include one or more modules that facilitate interaction between the processing component 602 and other components. For example, the processing component 602 may include a multimedia module to facilitate interaction between the multimedia component 608 and the processing component 602.

The memory 604 is configured to store various types of data to support the operations at the apparatus 600. Examples of such data include the following for any application or method to operate on the apparatus 600: instructions, contact data, phonebook data, messages, pictures, videos, etc. The memory 604 may be implemented by any type of volatile or non-volatile storage device or a combination thereof, such as a static random access memory (SRAM), electrically erasable programmable read-only memory (EEPROM), erasable programmable read-only memory (EPROM), programmable read-only memory (PROM), read-only memory (ROM), magnetic memory, flash memory, disk or CD-ROM.

The power supply component 606 supplies power to various components of the apparatus 600. The power supply component 606 may include a power supply management system, one or more power supplies, and other components associated with generating, managing, and distributing power for the apparatus 600.

The multimedia component 608 includes a screen that provides an output interface between the apparatus 600 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may not only sense the boundaries of the touch or swipe action, but also detect the duration and pressure associated with the touch or swipe action. In some embodiments, the multimedia component 608 includes a front-facing camera and/or a rear-facing camera. The front-facing camera and/or the rear-facing camera may receive external multimedia data when the apparatus 600 is in an operating mode, such as a shooting mode or a video mode. Each of the front-facing camera and the rear-facing camera may be a fixed optical lens system or have a focal length and optical zoom capability.

The audio component 610 is configured to output and/or input audio signals. For example, the audio component 610 includes a microphone (MIC), configured to receive external audio signals when the apparatus 600 is in an operating mode, such as a calling mode, a recording mode, and a voice recognition mode. The received audio signals may be further stored in the memory 604 or sent via the communication component 616. In some embodiments, the audio component 610 further includes a speaker for outputting the audio signals.

The I/O interface 612 provides an interface between the processing component 602 and a peripheral interface module, and the peripheral interface module may be a keypad, a click wheel, a button, etc. These buttons may include, but are not limited to, a home button, a volume button, a start button, and a lock button.

The sensor component 614 includes one or more sensors, configured to provide a status assessment of various aspects of the apparatus 600. For example, the sensor component 614 may detect an open/closed state of the apparatus 600, relative positioning of the components, for example, the components are the display and keypad of the apparatus 600, the sensor component 614 may also detect a change in the position of the apparatus 600 or a change in the position of one component of the apparatus 600, the presence or absence of user contact with the apparatus 600, the orientation or acceleration/deceleration of the apparatus 600, and temperature changes of the apparatus 600. The sensor component 614 may include a proximity sensor, configured to detect the presence of nearby objects in the absence of any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate the communication between the apparatus 600 and other devices by wired or wireless means. The apparatus 600 may access a wireless network based on any communication standard, such as Wi-Fi, 2G, 3G, or a combination thereof. In an embodiment, the communication component 616 receives broadcast signals or broadcast-related information from an external broadcast management system via a broadcast channel. In an embodiment, the communication component 616 further includes a near-field communication (NFC) module to facilitate short-range communication. For example, the NFC module may be implemented based on a radio frequency identification (RFID) technology, infrared data association (IrDA) technology, ultra-wideband (UWB) technology, bluetooth (BT) technology, and the like.

In an embodiment, the apparatus 600 may be implemented by one or more of: an application-specific integrated circuit (ASIC), a digital signal processor (DSP), a digital signal processing device (DSPD), a programmable logic device (PLD), a field-programmable gate array (FPGA), a controller, a microcontroller, a microprocessor, or other electronic element, to perform the above methods.

In an embodiment, a non-transitory computer-readable storage medium including an instruction is provided, such as a memory 604 including an instruction. The instruction described above is capable of being executed by the processor 620 of the apparatus 600 to complete the above methods. For example, the non-transitory computer-readable storage medium may be a ROM, a random access memory (RAM), a CD-ROM, a magnetic tape, a floppy disk, an optical data storage device, etc.

Figure 47:
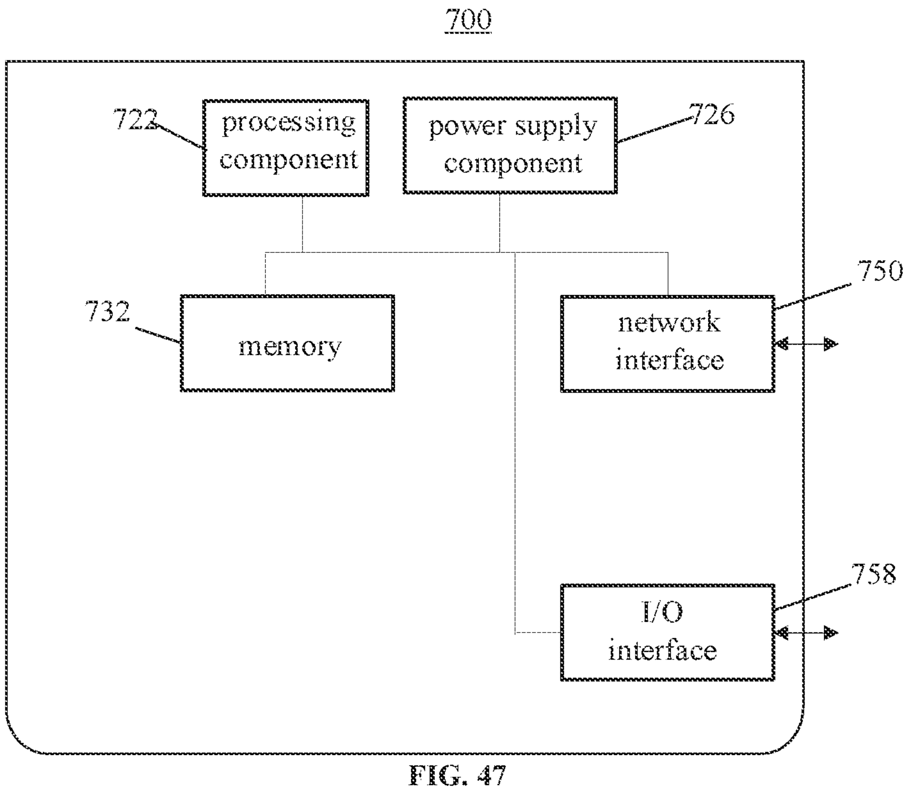
FIG. 47 is a block diagram of another apparatus for cell positioning illustrated according to an embodiment.

FIG. 47 is a block diagram of an apparatus 700 for cell positioning illustrated according to an embodiment. For example, the apparatus 700 may be provided as a server. Referring to FIG. 7, the apparatus 700 includes a processing component 722. The processing component 722 further includes one or more processors, and a memory resource represented by a memory 732 for storing instructions, such as an application program, that may be executed by the processing component 722. The application program stored in the memory 732 may include one or more modules each corresponding to a set of instructions. In addition, the processing component 722 is configured to execute the instructions to perform the method described above.

The apparatus 700 may further include a power supply component 726 configured to perform power management of the apparatus 700, a wired or wireless network interface 750 configured to connect the apparatus 700 to a network, and an I/O interface 758. The apparatus 700 may operate an operating system stored in the memory 732, such as Windows Server™, Mac OS X™, Unix™, Linux™, FreeBSD™, or the like.

It is further understood that "plurality" in the present disclosure refers to two or more, and other quantifiers are similar. The character "and/or", describing an associative relationship of the associated objects, indicates that three types of relationships can exist, e.g., A and/or B, which may mean: A alone, both A and B, and B alone. The character "/" generally indicates an "or" relationship between the related objects. The singular forms "a", "the" and "this" are also intended to include the majority form, unless the context clearly indicates otherwise.

It is further understood that the terms "first", "second", etc. are used to describe various types of information, but such information should not be limited to these terms. These terms are only used to distinguish the same type of information from each other and do not indicate a particular order or level of importance. Indeed, the expressions "first", "second", etc. may be used completely interchangeably. For example, without departing from the scope of the present disclosure, the first information may also be referred to as the second information, and similarly, the second information may be referred to as the first information.

It is further understood that the embodiments of the present disclosure, while describing operations in a particular order in the accompanying drawings, should not be construed as requiring that the operations be performed in the particular order shown or in a serial order, or that all of the operations shown be performed in order to obtain a desired result. Multitasking and parallel processing may be advantageous in particular environments.

After considering the specification and practicing the embodiments disclosed herein, those skilled in the art will easily come up with other implementation solutions of the present disclosure. The present disclosure is intended to cover any variations, uses, or adaptive changes of the present disclosure, which follow the general principles of the present disclosure and include common knowledge or commonly used technical means in the technical field that are not disclosed in the present disclosure. The specification and embodiments are only considered to be illustrative, and the true scope and spirit of the present disclosure are indicated by the following claims.

It should be understood that the present disclosure is not limited to the precise structure which has been described above and illustrated in the accompanying drawings, and that various modifications and alterations may be made without departing from the scope of the present disclosure. The scope of the present disclosure is limited only by the appended claims.

What is claimed is:

1. A cell positioning method, comprising:

determining, by a terminal, that the terminal does not support a current positioning mode; and sending, by the terminal, request information to a radio access network device, wherein the request information is used for requesting a core network device to perform positioning mode switch for the terminal.

2. The method according to claim 1, wherein the request information comprises at least one of:

a positioning mode supported by the terminal;

a positioning mode not supported by the terminal; or a reason for the terminal to request the positioning mode switch.

3. The method according to claim 2, wherein the reason for the terminal to request the positioning mode switch comprises the terminal being configured with cell measurement relaxation; wherein the cell measurement relaxation is used for indicating the terminal to increase a measurement period for performing measurement for a neighbor cell.

4. The method according to claim 3, further comprising at least one of:

sending first auxiliary information to the radio access network device, wherein the first auxiliary information is used for indicating a time range for applying the cell measurement relaxation; or sending second auxiliary information to the radio access network device, wherein the second auxiliary information is used for indicating an area range for applying the cell measurement relaxation.

5. The method according to claim 1, wherein the determining that the terminal does not support the current positioning mode comprises:

determining, in response to position request information sent by the radio access network device being received and the terminal being configured to apply measurement relaxation for a neighbor cell, that the terminal does not support the current positioning mode; wherein the position request information is used for requesting the terminal to report a positioning parameter required for the current positioning mode, and the positioning parameter comprises a measurement result of the neighbor cell.

6. The method according to claim 1, wherein the sending the request information to the radio access network device comprises:

sending a long term evolution (LTE) positioning protocol (LPP) message to the radio access network device, wherein the LPP message comprises the request information.

7. The method according to claim 6, wherein the sending the LPP message to the radio access network device comprises:

sending the LPP message to the radio access network device through small data transmission (SDT), wherein the terminal is in a radio resource control (RRC) inactive state.

8. The method according to claim 1, further comprising:

receiving a positioning capability request sent by the radio access network device; and sending positioning capability information to the radio access network device, wherein the positioning capability information is used for indicating a positioning mode not supported by the terminal.

9. The method according to claim 1, further comprising:

receiving indication information sent by the radio access network device, wherein the indication information is used for indicating a positioning mode after the positioning mode switch; and performing positioning based on the positioning mode after the positioning mode switch.

10. A cell positioning apparatus, characterized in comprising:

a processor; and a memory, configured to store an instruction executable by the processor; wherein the processor, through executing the instruction, is configured to;

determine that a terminal does not support a current positioning mode; and send request information to a radio access network device, wherein the request information is used for requesting a core network device to perform positioning mode switch for the terminal.

11. The apparatus according to claim 10, wherein the request information comprises at least one of:

a positioning mode supported by the terminal;

a positioning mode not supported by the terminal; or a reason for the terminal to request the positioning mode switch.

12. The apparatus according to claim 11, wherein the reason for the terminal to request the positioning mode switch comprises the terminal being configured with cell measurement relaxation; wherein the cell measurement relaxation is used for indicating the terminal to increase a measurement period for performing measurement for a neighbor cell.

13. The apparatus according to claim 12, wherein the processor is further configured to:

send first auxiliary information to the radio access network device, wherein the first auxiliary information is used for indicating a time range for applying the cell measurement relaxation; or send second auxiliary information to the radio access network device, wherein the second auxiliary information is used for indicating an area range for applying the cell measurement relaxation.

14. The apparatus according to claim 10, wherein the processor is configured to:

determine, in response to position request information sent by the radio access network device being received and the terminal being configured to apply measurement relaxation for a neighbor cell, that the terminal does not support the current positioning mode; wherein the position request information is used for requesting the terminal to report a positioning parameter required for the current positioning mode, and the positioning parameter comprises a measurement result of the neighbor cell.

15. The apparatus according to claim 10, wherein the processor is configured to:

send a long term evolution (LTE) positioning protocol (LPP) message to the radio access network device, wherein the LPP message comprises the request information.

16. The apparatus according to claim 15, wherein the processor is configured to:

send the LPP message to the radio access network device through small data transmission (SDT), wherein the terminal is in a radio resource control (RRC) inactive state.

17. The apparatus according to claim 10, wherein the processor is further configured to:

receive a positioning capability request sent by the radio access network device; and send positioning capability information to the radio access network device, wherein the positioning capability information is used for indicating a positioning mode not supported by the terminal.

18. The apparatus according to claim 10, wherein the processor is further configured to:

receive indication information sent by the radio access network device, wherein the indication information is used for indicating a positioning mode after the positioning mode switch; and perform positioning based on the positioning mode after the positioning mode switch.

19. A non-transitory computer-readable storage medium, configured to store an instruction, wherein the instruction, when being executed by a terminal, causes the terminal to perform operations comprising:

determining that the terminal does not support a current positioning mode; and sending request information to a radio access network device, wherein the request information is used for requesting a core network device to perform positioning mode switch for the terminal.

* * * * *